United States Patent
Kamada

(10) Patent No.: US 6,381,637 B1
(45) Date of Patent: Apr. 30, 2002

(54) INFORMATION APPARATUS HAVING AUTOMATIC WEB READING FUNCTION

(75) Inventor: Tomihisa Kamada, Tokyo (JP)

(73) Assignee: Access Co., Ltd., Tokyo (JP)

( * ) Notice: Subject to any disclaimer, the term of this patent is extended or adjusted under 35 U.S.C. 154(b) by 0 days.

(21) Appl. No.: 09/284,890

(22) PCT Filed: Oct. 23, 1997

(86) PCT No.: PCT/JP97/03830

§ 371 Date: Apr. 21, 1999

§ 102(e) Date: Apr. 21, 1999

(87) PCT Pub. No.: WO98/18088

PCT Pub. Date: Apr. 30, 1998

(30) Foreign Application Priority Data

Oct. 23, 1996 (JP) .............................................. 8-299664

(51) Int. Cl.⁷ .............................................. G06F 13/00
(52) U.S. Cl. ....................................... 709/218; 707/501
(58) Field of Search ................................ 709/217, 218, 709/219; 707/10, 100, 501

(56) References Cited

U.S. PATENT DOCUMENTS

| | | | | |
|---|---|---|---|---|
| 5,491,820 A | * | 2/1996 | Belove et al. .................. | 707/3 |
| 5,748,954 A | * | 5/1998 | Mauldin ....................... | 707/10 |
| 5,778,372 A | * | 7/1998 | Cordell et al. .............. | 707/100 |
| 5,802,292 A | * | 9/1998 | Mogul ........................ | 709/203 |

FOREIGN PATENT DOCUMENTS

| | | |
|---|---|---|
| JP | 04-205171 | 7/1992 |
| JP | 06-215043 | 8/1994 |
| JP | 06-251081 | 9/1994 |
| JP | 08-115250 | 5/1996 |

OTHER PUBLICATIONS

Nikkei Pasokon 10–21 1996(Oct. 21, 1996), Nikkei Business Publications, Inc., Ayumi Furusho, "WWW Autopilot Software Saving Wisely Telephone Charge and Connection Fee of Net –urfing (in Japanese)" pp. 204–209, particularly pp. 206–207.

Internet Magazine No. 19, (Aug. 1, 1996), K.K. Inpuresu, Sachio Murano, "Patronized by Net–Surfers, Naminori Yaro' Homepage Automatic collecting Software Appears (in Japanese)", pp. 312–317.

Internet Magazine No. 20, (Sep. 1, 1996), K.K. Inpuresu, Sachio Murano, "Through Homepages of Newspaper Publishers can be searched for with Netscape History, . . . (in Japanese)", pp. 276–281.

Noriyuki Hayashi, Katsuya Arai, and Yuzo Nakamura, "Auto Navigation Service for Internet (in Japanese)", Proceedings (3) National Conference No. 53 of Information Processing Society of Japan, (Sep. 4, 1996) pp. 211–212.

* cited by examiner

Primary Examiner—Dung C. Dinh
(74) Attorney, Agent, or Firm—Dellett and Walters

(57) ABSTRACT

An information apparatus which has access means by which a document on the Internet is accessed and automatic Web tracing means which automatically trace link destinations successively according to a predetermined rule and parameters based on the link information which is set in the accessed document. The predetermined rule is either a depth-first search or a width-first search. The predetermined parameters include at least a link depth limit to be used when the link destinations are traced downward in the hierarchy, an interval of time required for a transit from one document to another, and an automatic Web tracing time-out time. The rule and parameters may be specified by a user. Automatic Web tracing may be performed either on-line or off-line. Thus, time-varying information can passively be received as if it were television information, minimizing operation steps necessary for a user to perform the automatic Web browsing of the Internet.

12 Claims, 23 Drawing Sheets

FIG. 2   DEPTH-FIRST SEARCH
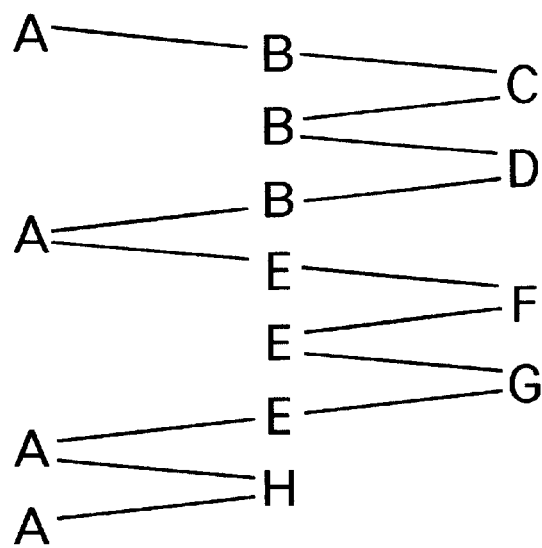
FIG. 3   WIDTH-FIRST SEARCH
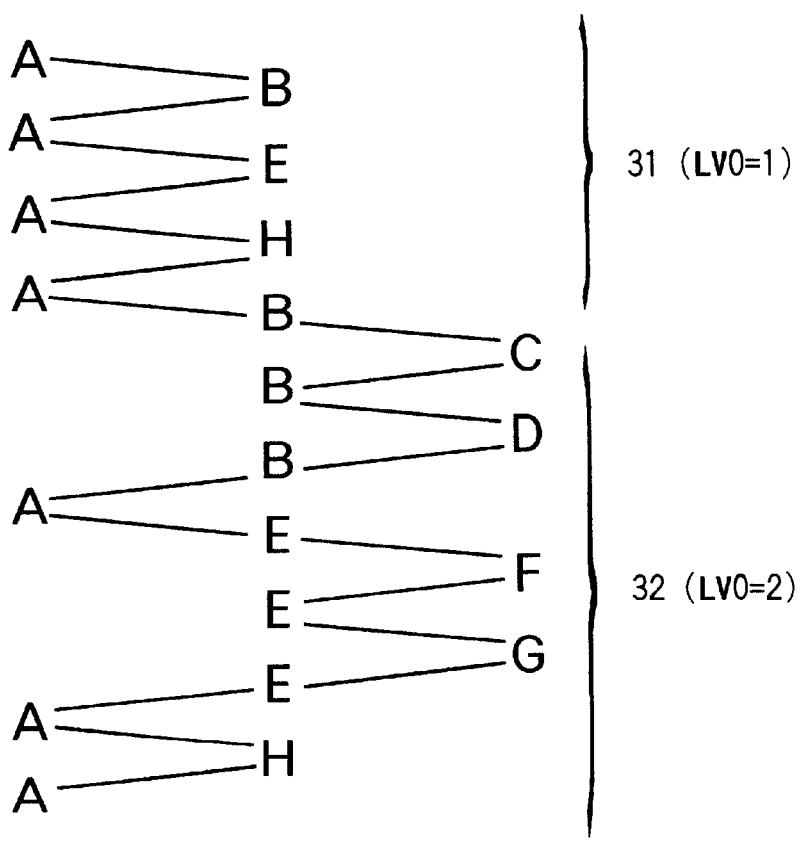

HISTORY TABLE 120

| | PAGE (121) | IN-PAGE POSITION (123) | CURRENT POSITION POINTER (125) |
|---|---|---|---|
| 1 | A | LINK 1 | |
| 2 | B | LINK 1 | |
| 3 | C | — | V |

FIG. 12(a)

| | PAGE (121) | IN-PAGE POSITION (123) | CURRENT POSITION POINTER (125) |
|---|---|---|---|
| 1 | A | LINK 1 | |
| 2 | B | LINK 1 | V |
| 3 | C | — | |

FIG. 12(b)

| | PAGE (121) | IN-PAGE POSITION (123) | CURRENT POSITION POINTER (125) |
|---|---|---|---|
| 1 | A | LINK 1 | |
| 2 | B | LINK 2 | |
| 3 | D | — | V |

READ-PAGE TABLE 130

| PAGE | POSITION | COUNT |
|------|----------|-------|
| A | LINK 1 | 1 |
| A | LINK 2 | 0 |
| A | LINK 3 | 0 |
| B | LINK 1 | 0 |
| B | LINK 2 | 1 |
| C | LINK 1 | 0 |
| C | LINK 2 | 0 |
| ⋮ | ⋮ | ⋮ |

FIG. 14

HISTORY TABLE 140

| | PAGE (141) | POSITION (142) |
|---|---|---|
| 1 | A | LINK1 |
| 2 | B | LINK1 |
| 3 | C | LINK1 |
| 4 | B | LINK2 |
| 5 | D | LINK1 |
| 6 | B | LINK2 |
| 7 | A | LINK2 |
| 8 | E | LINK1 |
| 9 | F | LINK1 |
| 10 | E | LINK2 |
| 11 | G | LINK1 |
| ⋮ | ⋮ | ⋮ |

(143 labels the leftmost index column)

FIG. 15

LINK-SOURCE TABLE 150

| PAGE | LINK-SOURCE URL | |
|---|---|---|
| | PAGE | POSITION |
| B | A | LINK 1 |
| C | B | LINK 1 |
| E | A | LINK 2 |
| F | E | LINK 1 |
| ⋮ | ⋮ | ⋮ |

```
<HTML>
 <HEAD>
 <TITLE>Title</TITLE>
 </HEAD>
 <BODY>
  This is text.
  . . . . .
  <A HREF="bbb.html">BBB</A>
  . . .

<A HREF="ccc.html"><IMAG
 SRC="ggg.gif"></A>
  . . .

</BODY>
</HTML>
```

HTML DOCUMENT

FIG. 20 (a)

Title

This is text.
. . . . .
B B B
. . .

BROWSER DOCUMENT

FIG. 20 (b)

LINK TO ANOTHER PAGE IN THE SAME SERVER

LINK-SOURCE FILE "aaa.html"   LINK-DESTINATION FILE "bbb.html"

BROWSER SCREEN OF "aaa.html"   BROWSER SCREEN OF "bbb.html"

LINK TO ANOTHER LOCATION IN THE SAME PAGE

"ccc.html"

BROWSER SCREEN

LINK TO A SPECIFIC LOCATION IN ANOTHER PAGE IN THE SAME SERVER

INFORMATION APPARATUS HAVING AUTOMATIC WEB READING FUNCTION

TECHNICAL FIELD

The present invention relates to the Internet, and more particularly to an apparatus having an Internet automatic Web browsing function.

BACKGROUND ART

As personal computers become popular recently, the Internet has become widely used. The Internet is a gigantic aggregate of interconnected computer networks. Its main functions include electronic mail, network news (electronic bulletin board or electronic conference), file transfer (FTP: file transfer protocol), and World Wide Web (WWW). In particular, WWW, an aggregate of hypertext documents coded in the language called HTML, described later, combines various types of information dispersively existing on the Internet and makes them accessible.

As a prerequisite for understanding the present invention, the following describes the structure and operation of the Internet system for the WWW and the structure of a hypertext document.

As shown in FIG. 24, the distribution of hypertext documents is performed by computers 243 and 244, called WWW servers, on the Internet. A user can use a browser program, called a WWW browser (also called a Web browser), on a client computer (hereafter simply called a client) to access documents on the Internet. Normally, the client computer 241 is connected to the Internet via a service organization called a service provider which offers a dedicated communication line of its own. That is, the client computer 241 dials up the host computer of the service provider via a public line to make access to the Internet. This makes it possible for the user to get information (text, image, sound, and so on) from around the world while staying at home. This practice is called network surfing because it is like surfing through information waves.

A unit of information that is accessed is a file on the WWW server, called a page. Setting up a link, which will be described later, allows the user to jump from one page to another for sequential browsing. The length of a page is variable and may change according to the page creator.

A particular page (home page) on the WWW is assigned an address called a URL (Uniform Resource Locator) which is a unique address on the Internet.

A URL is composed of a protocol name, server name, and an item path name, as shown below.

http://www.abc.or.jp/def/ghi.html

The protocol name indicates the method by which the computer interprets information. Because the WWW server and the Web browser transfer information by the method called HTTP (Hyper Text Transfer Protocol), the protocol name, the first part of the above URL, is "http:". There is also a protocol, called ftp, for use in file transfer. The "www.abc.or.jp" represents a server name. The "www" indicates that the server is a WWW server. The "abc" in "abc.or.jp" indicates an organization name, "or" indicates an organization type (in this example, an organization/individual), and "jp" indicates a code representing a country (in this example, Japan). The item path name "def/ghi.html" after the server name indicates the location of an item on the server. The path name usually indicates the name of a file constituting a page. The "def" in "def/ghi.html" is a directory name, "ghi" is a file name, and "html" is an extension indicating that the file is an html file.

Next, the structure of an HTML file (HTML document) will be described.

As described above, HTML is an abbreviation for Hyper Text Markup Language, and a WWW document is usually written in this language. A document written in this language is called an HTML document, and its file is called an HTML file (or HTML text).

FIG. 20 shows the basic structure of an HTML document. An HTML document, a text file in essence, contains codes, called tags enclosed by symbols "<" and ">", in a page. Normally, a specified range is bounded by a pair of the start tag and the end tag. The end tag is distinguished from the start tag by "/". Note that there is a tag which is used alone, such as <P> indicating the start of a new paragraph. The tag allows character design information and layout information, as well as link information, to be specified. The browser interprets the tag, displays on the screen the HTML document in a format intended by the creator, or controls link operations.

The detailed description of.HTML is omitted here because it is well known. As shown in FIG. 20(a), the basic structure of an HTML document contains various types of tags in the text document. When the HTML document is interpreted by the browser and displayed on the screen, the tags are not displayed, as in FIG. 20(b), with only the specified control reflected on the display. The function which passes control to another page, associated with a character string in the HTML document, when the user executes an operation (for example, click) on the character string, is called a link. In this specification, such a character string part in the HTML document is also called a link for the sake of convenience. A link 201 in a page of the HTML document "aaa.html", shown in FIG. 20(a), is described as:

<A HREF="bbb.html">BBB</A>

The tags used for setting up a link are called anchor tags (<A...>...</A>), and the part enclosed by the anchor tags is called an anchor point or a hot point. The "HREF=" in <A HREF="bbb.html"> in the start tag of the anchor tags indicates access information on the link destination (in this example, a file name). On the browser screen, the character string "BBB" is highlighted as in the displayed character string 203 shown in FIG. 20(b). This highlight display is realized by displaying the character string in a color different from other character strings or by underlining. This allows the user to identify that, if the user points this character string, he or she will be able to jump to some other page.

A link 202 indicates a link to an in-line image. In this case, the image file named "ggg.gif" is displayed on the screen as an image 204. When the user points the image 204, the content of the link destination "bbb.html" is read and displayed. An in-line image is an image embedded in a page of the HTML document page for display.

There are several patterns used in a link for link destination access information.

As shown in FIG. 21, when a link is set up (or created) for another page (or an HTML file) in the same server (host), the file name (sometimes, including a directory) is link destination information. FIG. 21(a) shows a link source HTML file and a link destination HTML file. FIG. 21(b) shows the content displayed on the browser display screens associated with the respective files. In this example, when the user points the anchor point character string "BBB", the HTML file "bbb.html" which is a link destination representing another page is requested and its content is displayed.

As shown in FIG. 22, a link may be set up to some other location in the same page. In such a case, the item name of the location is used as link destination information. As shown in FIG. 22(a), the link source description <A HREF= "#aaa>AAA</A>" indicates the position of the link destination and, on the other hand, the link destination description <A NAME="aaa">AAA</A> indicates that the item name "aaa" is linked with the source. As shown in FIG. 22(b), when the user points the highlighted character string "AAA" on the browser screen, display control is passed to the position of the item "AAA" which is in a subsequent location within the same page. This is useful in a long page to display a list of items each having a link to the corresponding item at a subsequent location.

FIG. 23 indicates a link to a location in a separate page in the same server. In this case, the combination of the file name of the separate page and an item name in the document is used as the link destination access information. In this example, control jumps to the item "ppp" in a separate file "bbb.html" in the same server. FIG. 23(a) shows the link source and link destination HTML files, and FIG. 23(b) shows the corresponding browser screens.

Referring again to FIG. 24, information transfer between a client and the WWW server when accessing WWW will be described briefly.

The user connects the client computer 241 to the Internet and then starts the Web browser. Then, the Web browser on the client computer 241 requests a WWW server 243 of a previously-specified URL (this may be changed by the user) to send the content of the page identified by the URL (REQ1). Upon receiving this request, the WWW server 243 returns the HTML text of the page to the client computer 241 (RES1). When the browser receives the text, it analyzes the content and displays it on the screen of the client computer 241. When this page contains an in-line image (and others such as a sound), the browser requests the server 243 for that information (REQ2). In response to this, the WWW server 243 returns an image file (RES2). Upon receiving this file, the browser displays the image at a location specified in the page. When the user points a link in the page displayed on the screen, for example, when the link points to another page on the same WWW server 243, the browser requests the WWW server 243 to send the HTML text of the page (REQ3). In response, the WWW server 243 returns the text (RES3). In addition, when the link destination of the link in the page specified by the user is on a separate WWw server 244, the browser requests the server 244 to send the page information of the link destination (REQ4). In response, the server 244 returns the corresponding page information (RES4). The browser displays the received information on the screen.

A WWW access is made according to such a procedure. The user is able to type an arbitrary URL from the keyboard, instead of specifying a link, to access the page.

Although personal computers become used at home, only those having knowledge on computers or experience in operation to some extent can connect computers to the Internet and enjoy network surfing. Not all members of a family can enjoy network surfing with ease.

These days, to cope with this situation, a TV set with a built-in Internet connection function or an Internet connection apparatus which can be connected to a TV set externally is made available. These TV sets or apparatuses (collectively called information apparatus in this specification), intended for users with no computer knowledge, usually do not have a unit, such as a keyboard, for entering a user instruction into the information apparatus; instead, they have special remote control devices for operation. The browser screen, its menu display, and so on are also designed for that purpose. However, the television is designed to give information continuously without user interactions, while the Internet browser requires user interactions to keep on operation, i.e., requests the user to watch the screen and to give operation instructions. Therefore, this operation could sometimes be cumbersome to passive users who are familiar with the television.

In view of the foregoing, it is an object of the present invention to provide an information apparatus with an Internet automatic Web browsing function which allows the user to receive information passively, as with a television, while keeping the operation required when browsing Internet Webs to a minimum.

DISCLOSURE OF INVENTION

An information apparatus with an automatic Web browsing function according to the present invention, comprises access means for accessing documents on the Internet; storage means for storing data of the accessed documents; and automatic Web tracing means for sequentially and automatically tracing link destinations according to a predetermined rule and parameters based on link information defined in the documents stored in the storage means.

This allows even a user with no computer knowledge or operation experience can automatically browse the Web on the Internet continuously in much the same manner the user watches the television without cumbersome operations. Of course, if the user finds interesting information during automatic Web browsing, he or she may suspend or stop automatic browsing to view the information carefully. Today, some televisions offer multiple-divided television subscreens (for example, divided into left and right subscreens) to display separate channel pictures in the separate areas. One of the areas may be used for an Internet screen.

It should be noted that a link-destination document and a link-source document may belong to separate pages in the same Web server, to the same page, or to separate Web servers.

The predetermined rule may relate to either a depth-first search or a width-first search. The depth-first search is suitable for first sequentially tracing the links associated with interested information. On the other hand, the width-first search is suitable for first grasping all the link destinations in the current page and then viewing the contents of further destinations linked with each link destination.

The parameters may be composed of at least the link depth limit to be used when the link destinations are traced downward in the hierarchy and an interval of time required for a transit from one document to another. The link depth limit, if appropriately set, prevents control from going too far from the start point. The interval of time should preferably be set to a length of time during which the outline of a displayed page (or part of a page) may be identified.

The automatic Web tracing means may comprise a history table in which a page access information history is stored each time control moves from a link source to a link destination and a read-page table in which information indicating, for each link destination of each link in a page, whether the link destination was visited or not, wherein the history table is referenced when control returns from one of the link destinations to the link source during automatic Web browsing and the read-page table is referenced to check for unread links.

The parameters may further include an automatic Web browsing time-out time (limit time). The maximum automatic Web tracing time may be set by specifying the time-out time. The information apparatus may further comprise specifying means for allowing a user to specify the rule and parameters. This enables the user to select the rule and parameters he or she likes.

Automatic Web tracing is usually performed while the user is connected to the Internet (that is, on-line), but it may also be done when the user is not connected to the Internet (off-line). In that case, the information apparatus further comprises non-volatile storage means for storing the documents obtained from the Internet, wherein the automatic Web tracing means perform automatic Web tracing with respect to the documents stored in the non-volatile storage means when the information apparatus is not connected to the Internet.

Because connecting to the Internet via a public line requires telephone charges, storing required documents in the non-volatile storage means in advance and performing automatic Web tracing (in off-line mode) with respect to the stored documents can reduce the cost. That is, off-line browsing eliminates the need for displaying documents on the screen at communication time and does not need to consider user's browse time, thus reducing the communication time. The information apparatus according to the present invention is not limited to the connection to a public line but the connection to a leased line may also be possible.

In this specification, the public line includes an analog telephone line, a digital line such as an ISDN line, and a CATV line.

It is desirable that the information apparatus further comprise inquiry means for asking a user if a connection is to be made automatically to the Internet when the document at the next link destination is not stored in the non-volatile storage means during off-line automatic Web tracing. This prevents the line from being connected without the user being aware of the connection.

The documents must be stored in the non-volatile storage means for use in off-line automatic Web tracing. To do so, the information apparatus may comprise automatic downloading means for automatically acquiring not only the specified document on the Internet but also linked documents through the on-line automatic Web tracing function into the non-volatile storage means.

The automatic Web tracing function according to the present invention is implemented by software. The computer program comprises the functions of accessing documents on the Internet; and sequentially and automatically tracing link destinations according to a predetermined rule and parameters based on link information defined in the accessed documents.

Therefore, the present invention includes in its scope a recording medium which stores the program therein. This program may function as what we call a plug-in of an existing browser. The recording medium may be a ROM that may be mounted on a board in the apparatus, a floppy disk that is portable and nonvolatile recording medium, an MD (mini disk), a Zip medium, a CD (compact disk) ROM, and a fixed secondary storage unit such as a hard disk.

BRIEF DESCRIPTION OF DRAWINGS

FIG. 2 is a diagram showing depth-first-search auto-navigation used in an embodiment of the present invention;

FIG. 3 is a diagram showing width-first-search auto-navigation used in the embodiment of the present invention;

FIG. 12 is a diagram showing an example of the configuration of a history table used during auto-navigation processing;

FIG. 13 is a diagram showing an example of the configuration of a read-page table used during auto-navigation processing;

FIG. 14 is a diagram showing an example of another configuration of the history table used during auto-navigation processing;

FIG. 15 is a diagram showing an example of the configuration of a link-source table used with the history table shown in FIG. 14;

FIGS. 20(a) and (b) comprise a diagram showing an HTML document;

BEST MODE FOR CARRYING OUT THE INVENTION

An information apparatus with the automatic Web browsing function according to the present invention will be described in detail.

Figure 4:
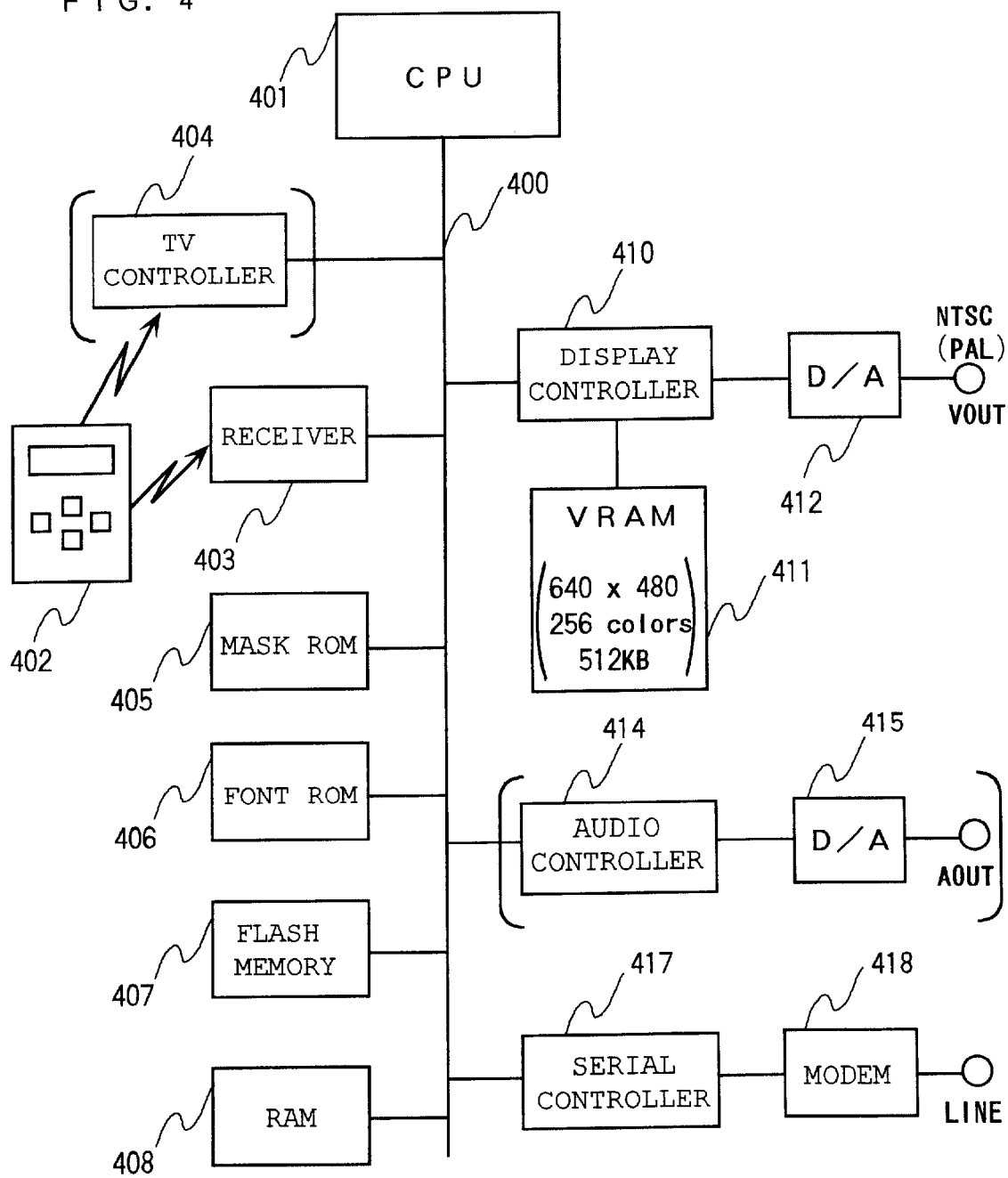
FIG. 4 is a block diagram showing an example of the hardware configuration of an information apparatus to which the present invention is applied.

FIG. 4 shows an example of hardware configuration of an apparatus for implementing the embodiment. This hardware may be built in the television set or externally connected.

In the configuration shown in FIG. 4, a central processing unit (CPU) 401 is connected to a bus 400 and, via the bus

400, performs the overall control of the information apparatus shown in FIG. 4. A mask ROM 405 contains computer programs, such as a browser, to be executed by the CPU 401. A font ROM 406 contains font data to be used on the television screen of the browser and so on. A flash memory 407, a re-writable non-volatile memory, contains data, such as URLs or electronic mail addresses, a user wants to store. The flash memory 407 may also contain upgradable programs. Instead of, or in addition to, the flash memory, a secondary storage unit, non-volatile storage means such as an MD (mini disk) or hard disk, may also be used. A RAM 408 has a work area required by the CPU 401 to execute programs or an area where various parameters are stored. The RAM 408, with a large amount of storage, may also be used as a cache for temporarily storing page information (files containing HTML text, image, sound, and so on) received from the network. A cache with the use of above-described secondary storage unit may also be used.

The information apparatus is connected to a public line via the line terminal (LINE). The line terminal is connected to the bus 400 via a modem 418 and a serial controller 417. When using an ISDN line, a DSU (Data Service Unit) and a TA (Terminal Adapter) are used.

When displaying page information received by this information apparatus over the public line on the television screen, the information is first drawn in a display memory (VRAM) 411 via a display controller 410. The content of the display memory 411 is output from a video output terminal (VOUT) via a digital-analog (D/A) converter 412 and is entered into the video input terminal (not shown) of the television.

Switching between the television screen and the Internet screen is done by a controller (not shown in the figure) on the television which is connected to the VOUT terminal.

Page information sometimes contains audio information. To process audio information, an audio controller 414 and a digital-analog (D/A) converter 415 are provided. Audio signals are output from the audio output terminal AOUT for input into the audio input terminal (not shown in the figure) on the television. Alternatively, when a loudspeaker is provided on an Internet board, audio information is output from the loudspeaker.

The Internet board is a substrate on which all or some of the components shown in FIG. 4, except a remote controller 402, are provided.

A user uses the remote controller 402 to control this information apparatus. The signal (for example, an infrared light signal) generated by the remote controller 402 is received by a receiver 403 and is interpreted by the CPU 401. The remote controller 402 may also be used for normal television operation. In that case, the television operation signal is sent to the CPU 401 via a TV controller 404.

To issue an Internet connection instruction from the information apparatus shown in FIG. 4, the user must, for example, press a special button on the remote controller 402 provided for that purpose. Pressing the button causes the CPU 401 to start the Internet browsing software program, called a Web browser, and to make a dial-up connection to the Internet connection company called a service provider. Then, the menu screen containing various menu items is displayed on the television screen.

Figure 5:
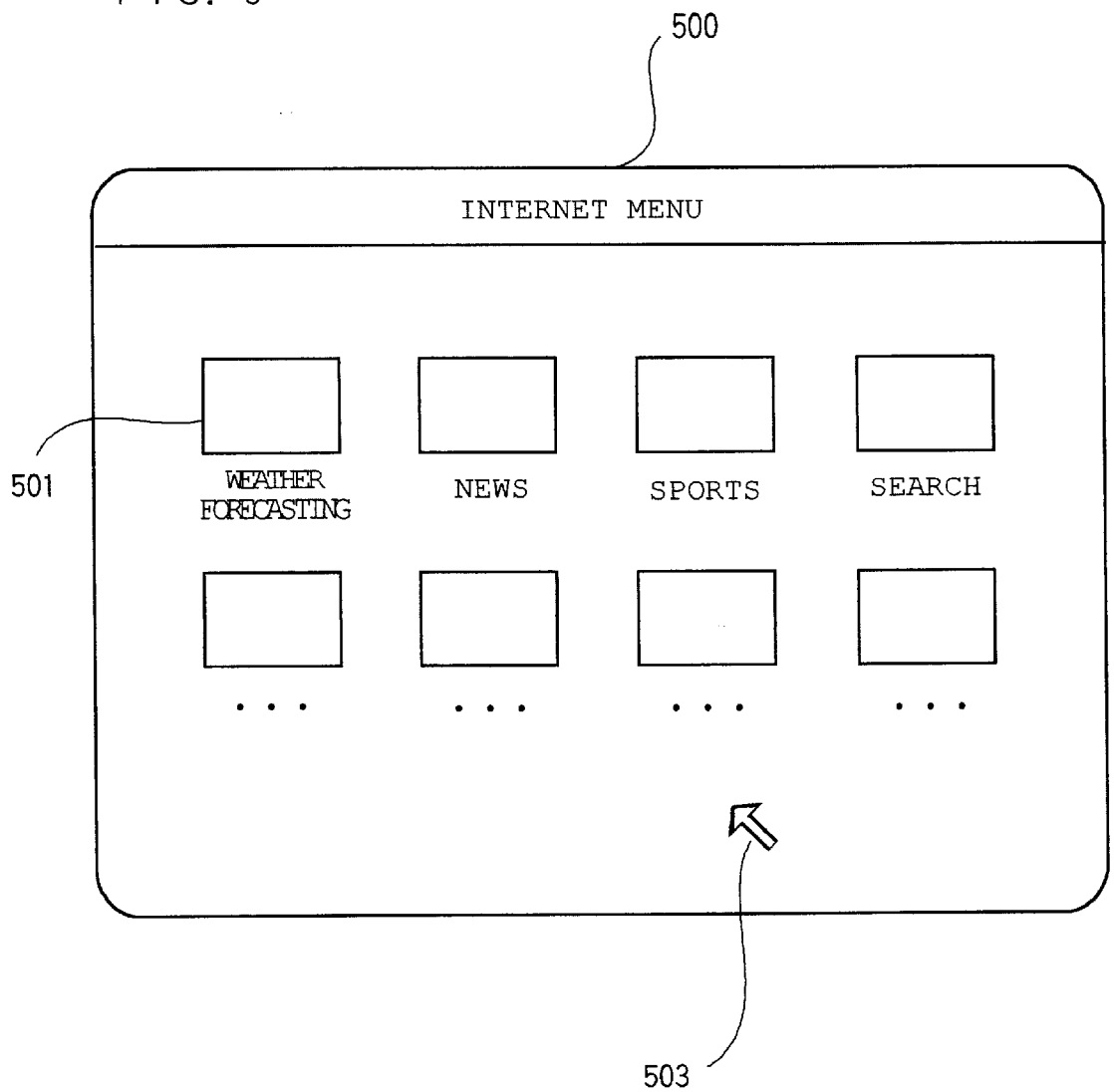
FIG. 5 is a diagram showing an example of an Internet menu displayed on the television screen of the information apparatus according to the present invention.

FIG. 5 shows an example of an Internet menu displayed first after the Internet connection is made. This menu screen 500 contains various menu items such as weather forecasting, news, sports, search, etc. This screen information may be stored in the memory (for example, mask ROM 405) in the information apparatus. However, considering a potential need for updating the content, it is desirable that the menu screen information be sent from the provider immediately after the Internet connection is made. The user can move a cursor 503, as he wishes, on the screen with the use of the remote controller 402. With the cursor 503 on a desired menu item, the user performs a selection operation (for example, press the selection button) to select the menu item. The movement operation of the cursor 503 is performed, for example, by operating the arrow keys, indicating the up, down, right, and left directions, provided on the remote controller 402. Instead of using the cursor 503, one item may be highlighted at a time so that the user can move the highlighting from one item to another with the use of the arrow key to select one item while it is highlighted.

Each menu item on the menu screen 500 is associated with a link as described above and, according to the selected menu item, the link-destination page of the link is read. After that, by pointing links on the screen, the user can browse new pages, one at a time.

The present invention provides a function allowing the links to be traced automatically. In this specification, this function is called an auto-navigation function (automatic Web tracing function). The auto-navigation function may be started, for example, by pressing the special button on the remote controller 402 or a button on the screen.

Figure 6:
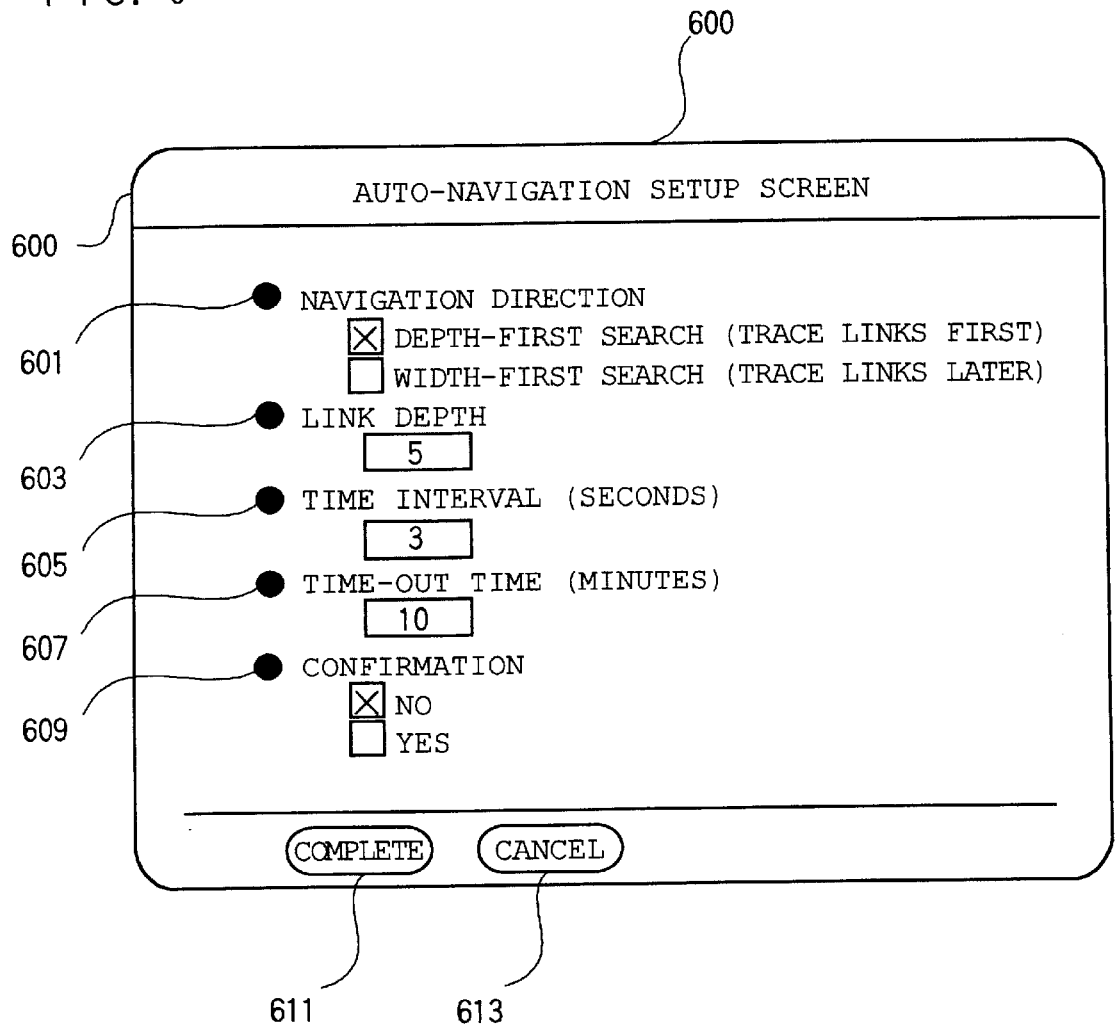
FIG. 6 is a diagram showing an auto-navigation parameter setup screen displayed on the television screen.

FIG. 6 shows an example of the setup screen for various parameters for use with the auto-navigation function. This setup screen 600 may be displayed in response to a user instruction, for example, through a special button on the remote controller 402 or a menu item on the menu screen for that purpose. In this example, the user specifies a navigation direction 601, a link depth 603, a time interval 605, a time-out time 607, and a confirmation 609. The confirmation 609, used in the second embodiment which will be described later, is mentioned here for convenience.

The navigation direction 601 specifies, when there are a plurality of links in a page, whether the first link in each page is to be sequentially traced first or all the link destinations of the links in one page are to be traced first. The former is called a depth-first search, while the latter is called a width-first search. In the example in the figure, the depth-first search is selected.

The link depth 603 is used to specify the maximum number of times the links are to be traced sequentially into lower hierarchies. In the example in the figure, a depth value "5" is specified. The depth is "1" when control is passed to the link destination (sometimes in the same page) of a particular link (anchor point) in the page displayed when the auto-navigation function is started. The depth of "5" indicates that such control transfer is repeated four more times.

The time interval 605 is used to specify the period of time (in seconds) from the moment one page is displayed to the time the display is switched to the next page. The illustrated example shows "3 seconds" being specified. If the time expires before one screenful of page is displayed, the operation ends even if the display operation is in progress and the display of the next page is started. An appropriate value for the time interval 605 may be changed according to the communication speed (bps) or user preferences.

The time-out time 607 is used to specify the auto-navigation duration time (in minutes). In the illustrated example, "10 minutes" is specified. When the time expires, auto-navigation ends.

The confirmation 609 is used to specify whether or not the dialog box (confirmation panel) is to be displayed asking the user whether to connect the line when information needs to be read, over the line, during off-line auto-navigation which will be described later. In the example in the figure, "No" is specified.

After specifying these items, the user presses the "Complete" button (button on the screen) 611 to store the specified information. In the configuration shown in FIG. 4, this specified information is stored, for example, in the flash memory 407 to retain the same specified information even after the power is turned off. To cancel the specified information on the setup screen 600 during modification, the user presses the "Cancel" button 613. Pressing this button retains the previous setup information.

For these setup items, the initial setup values (default values), which will be specified automatically when the user does not specify the values, may be defined.

Figure 1:
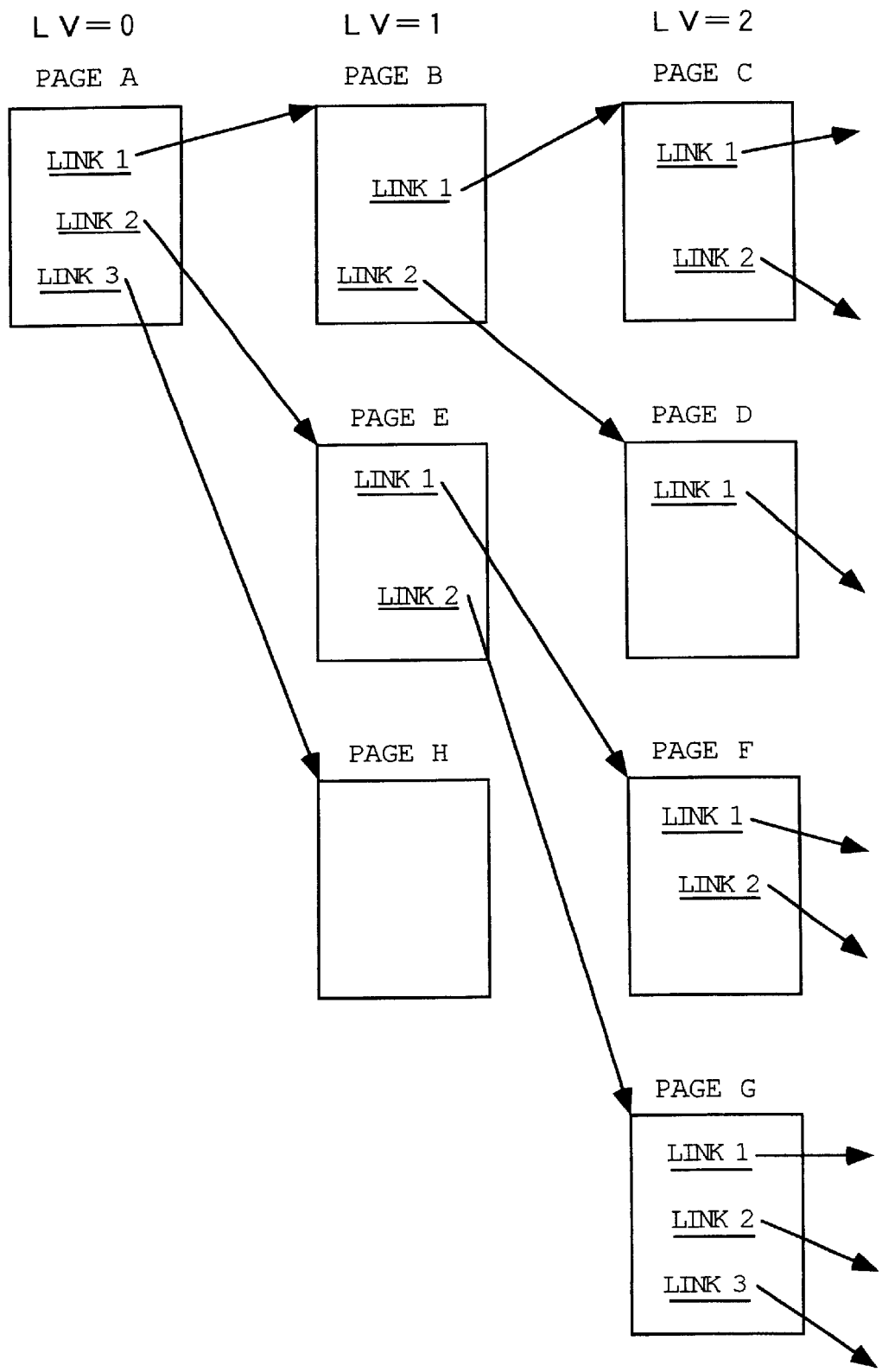
FIG. 1 is a diagram showing links among the hierarchical structure of pages that may be browsed by an Internet Web browser.

FIG. 1 shows hierarchically the relation between a home page and pages of link destinations of the links in the home page. Here, the "home page" refers to an HTML document created by individuals, organizations, enterprises and so on, and added to the WWW server. Sometimes, the first page of a document is also called a home page. A "page", usually corresponding to one data file, is a unit to be displayed at a time on the browser screen (including part of image to be viewed by scroll if the image does not fit in the screen range). In FIG. 1, page A has links 1, 2, and 3 pointing to pages B, E, and H, respectively (or specific locations within the page). Also, page B has links pointing to pages C and D. Similarly, page E has links pointing to pages F and G. Page H has no link to any page. Pages C, D, F, and G each have one or more links. As described above, a link in one page may have a link destination at another location within the same page. Therefore, two or more pages shown in FIG. 1 may belong to the same page. The "LV" shown at the top of FIG. 1 indicates the link depth (also called a link level in this specification).

With the above-described hierarchical relation of the page as an example, the following explains an example of auto-navigation.

FIG. 2 shows the page transition during automatic Web page tracing when the "depth-first search" is selected. In this example, the "link depth" is assumed to be "2" for the sake of description. In practice, the depth may be larger. Under this condition, the links are traced sequentially from page A to pages B and C which are hierarchically lower levels. Because the link level reaches the maximum of "2", control returns to page B which is the parent page (link-source page) of page C. When control returns to a previously-traced page, the pages containing links not yet traced are displayed so that such links may be viewed. In this stage, because page B has another unread link (link 2) that has not yet been traced, control goes to the link destination which is page D. When control goes to page D, control returns to page B again because of the link depth limitation. Then, because there is no further branch, control returns to page A which is the parent page. Similarly, after tracing pages E, F, E, G, and E, control return to A, the first page, and then goes to page H. Because page H has no link, control returns to page A. The display time of each page is determined by the specified "time interval". Auto-navigation is performed in this manner. If the "time-out time" expires during the operation, auto-navigation ends at that moment. As will be described later, auto-navigation may be suspended, restarted, stopped, or skipped.

FIG. 3 shows the page transition when the "width-first search" is selected. In this example, the "link depth" is also assumed to be "2". In the width-first search, when a page (page A) where auto-navigation starts includes a plurality of links, the link destinations (link destinations at link level 1) of the plurality of links are all traced first and then control goes to the link destinations (at link level 2 or lower) of each link. Therefore, control goes from page A to page B and returns to page A, then goes to page E and returns to page A, and then goes to page H and returns to page A. Control always returns to the parent page A after control goes to a link destination because, for example, in page B the URL of page E, which is at the same hierarchical level, is unknown. Control also returns to the parent to check the content of the next link destination. Next, control goes to link level 2. That is, control starts from page A, and proceeds through pages B, C, B, D, B, A, E, F, E, G, E, A, H, and A, in this order.

Figure 7:
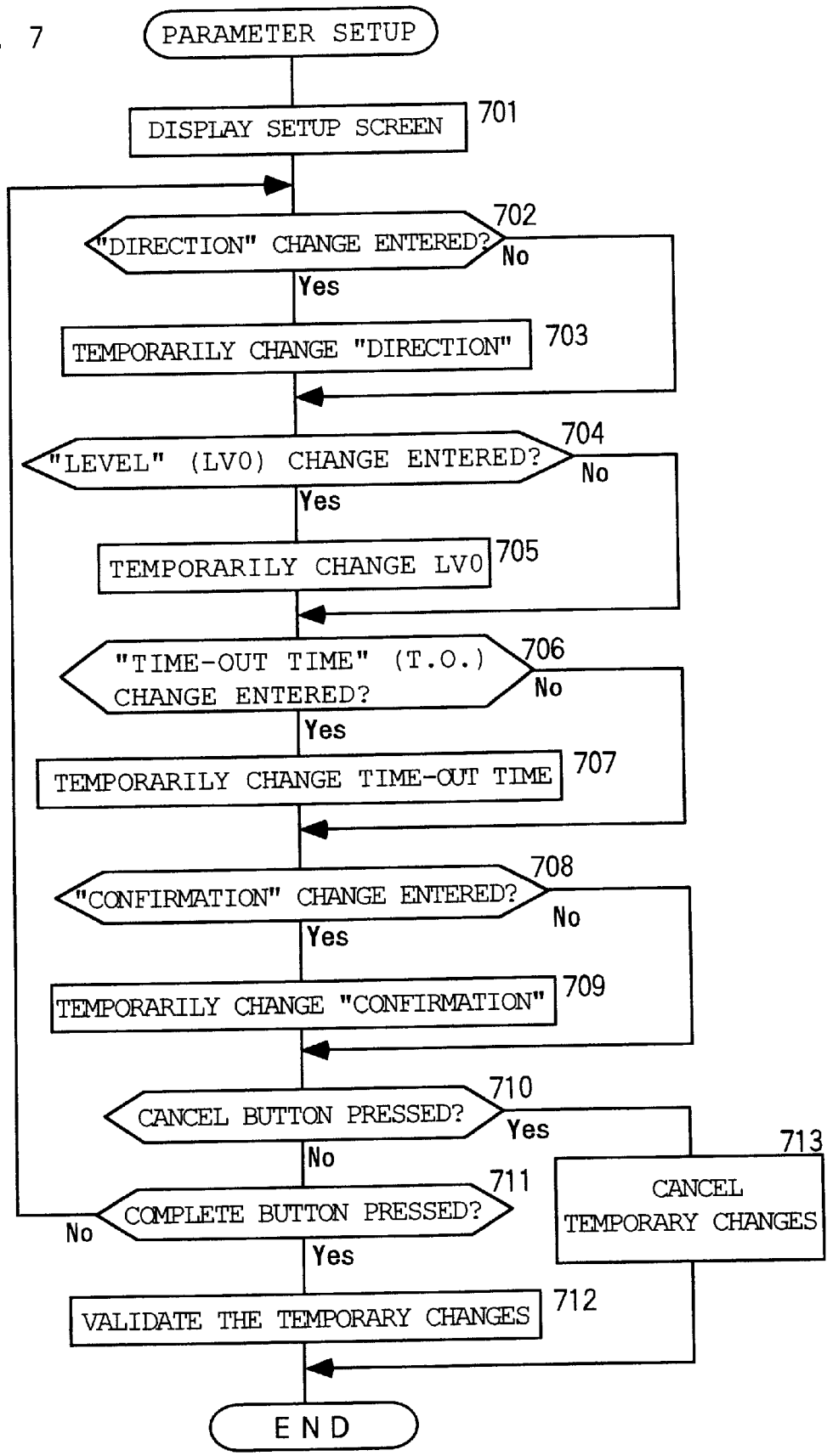
FIG. 7 is a flowchart showing an example of auto-navigation parameter setup of the information apparatus according to the present invention.

FIG. 7 shows a flowchart of processing for setting up auto-navigation parameters. As described above, this processing is started by the user pressing a special button on the remote controller 402 or selecting a menu item on the menu screen. First, a setup screen 600 shown in FIG. 6 is displayed on the television screen (701). Next, a check is made to see if the user has entered a navigation direction change (702). The user can specify a change of the navigation direction by controlling the cursor through the remote controller 402. If such setup-change is entered, the navigation direction will temporarily be changed (703). The "temporary change" means that changed parameters are temporarily stored. This is because, until the "Complete" button in FIG. 6 is pressed, the change does not take effect. If no direction change is entered, control skips step 703 and goes to step 704. Next, a check is made to see if a link depth limit (LV0) change has been entered (704). If such a change is entered, the link level will be changed temporarily (705). If no such change is entered, control skips step 705 and goes to step 706. A numeric value on the setup screen indicating the link depth limit may be entered by a ten-key pad (if available on the remote controller) or increased or decreased through by arrow keys. Similarly, a check is made to see if a time-out time (T.O.) change has been entered (706). If such a change is entered, the time-out time will temporarily be changed (707). In addition, a check is made to see if a confirmation change has been entered (708). If such a change is entered, the specified content will temporarily be changed (709). In addition, a check is made to see if the "CANCEL" button 613 has been pressed (710). If pressed, all the temporary changes are canceled (713) and processing ends. The "temporary change cancellation" means that the changed parameters that are temporarily stored will not be used as setup parameters. If the CANCEL button is not pressed, a check is made to see if the COMPLETE button 611 has been pressed. Upon the pressing of the button, all the temporary changes are enabled (712). That is, the changed contents are stored preferably in the non-volatile memory (flash memory 407 in FIG. 4) as new setup parameters. If the "COMPLETE" button 611 was not pressed, control returns to step 702.

Next, FIG. 8 to FIG. 11 show the flowcharts of an example of auto-navigation in this embodiment. Before describing these flowcharts, the tables used in the processing are described in FIGS. 12 and 13.

FIG. 12 shows an example of the structure of a history table 120 used in this embodiment. This is a table used to store the history of pages sequentially traced through the links. This table allows control to go from a current page back to its parent page (link-source page). This history table 120 is composed of three columns: a page 121, a in-page position 123, and a current position pointer 125 indicating the position currently displayed. This history table 120 contains only one sequence of the hierarchical tree shown in FIG. 1. For example, when control moves from page A to pages B and C sequentially through the links in the example shown in FIG. 1, the three records for the pages are sequentially stored in the history table 120, as shown in FIG. 12(a). The current position pointer 125 indicates that the third page C is the page currently displayed. Next, when control returns from the current page C to page B, the number of records is still three but the current position pointer 125 indicates the second record as shown in FIG. 12(b). Next, when control moves from page B to page D, a new sequence A→B→D is stored in the history table 120, as shown in FIG. 12(c), because control goes into another sequence different from the old tree sequence A→B→C. The current position pointer 125 indicates record 3. In the structure of the history table 120, the number of records stored in the history table 120 corresponds to the link depth.

FIG. 13 shows an example of the structure of a read-page table 130 used in this embodiment. The read-page table 130 is used to manage a link-destination-read count 135 in order to check if, for each position (link, that is, anchor point) 133 in a page 131 that was read (visited) at least once, its link-destination page was read. When control returns from one page to another during auto-navigation, this read-page table 130 is used to check if there remains links, the link-destinations of which have not yet been visited.

Figure 8:
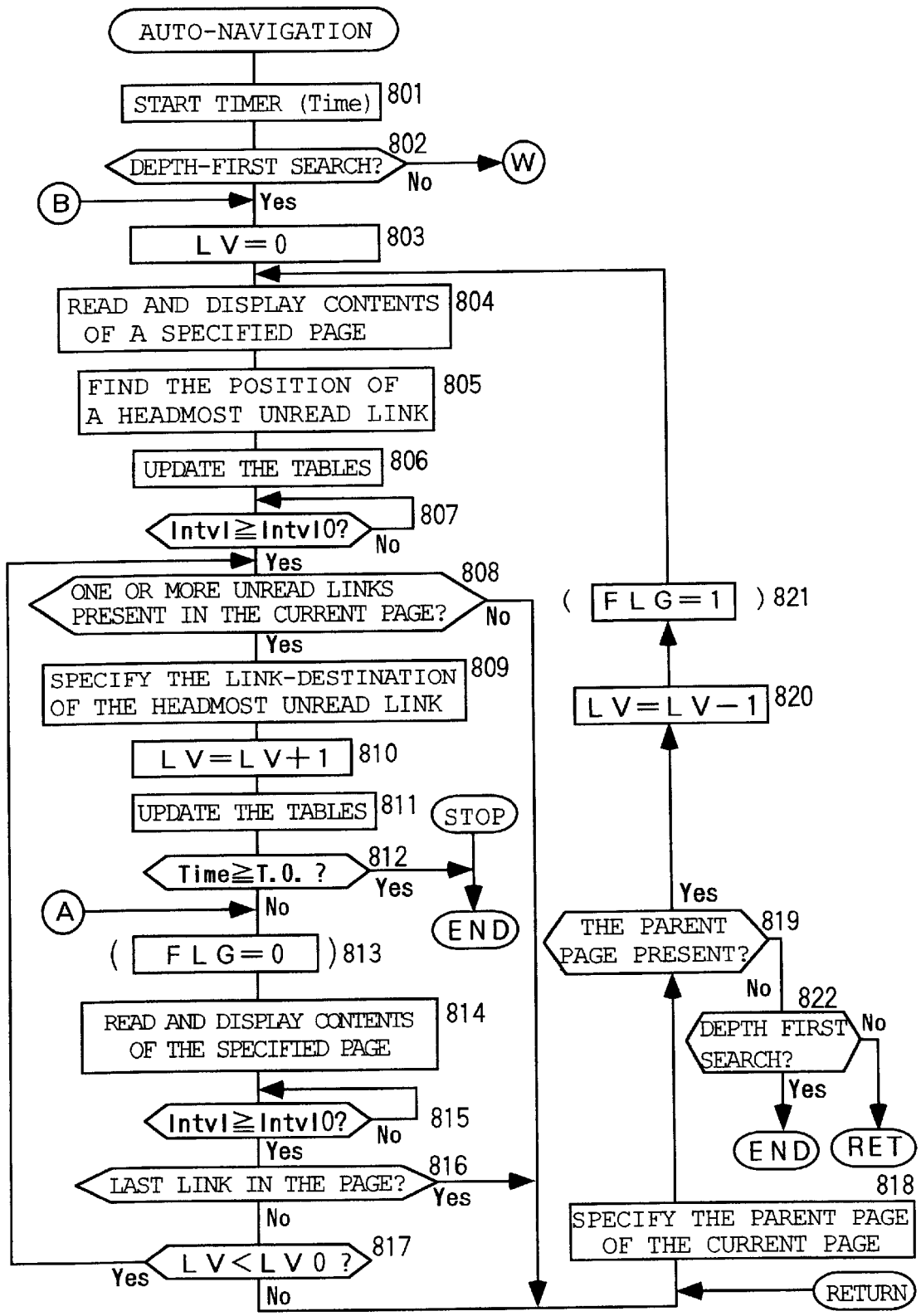
FIG. 8 is a flowchart showing an example of auto-navigation processing of the information apparatus according to the present invention.
Figure 9:
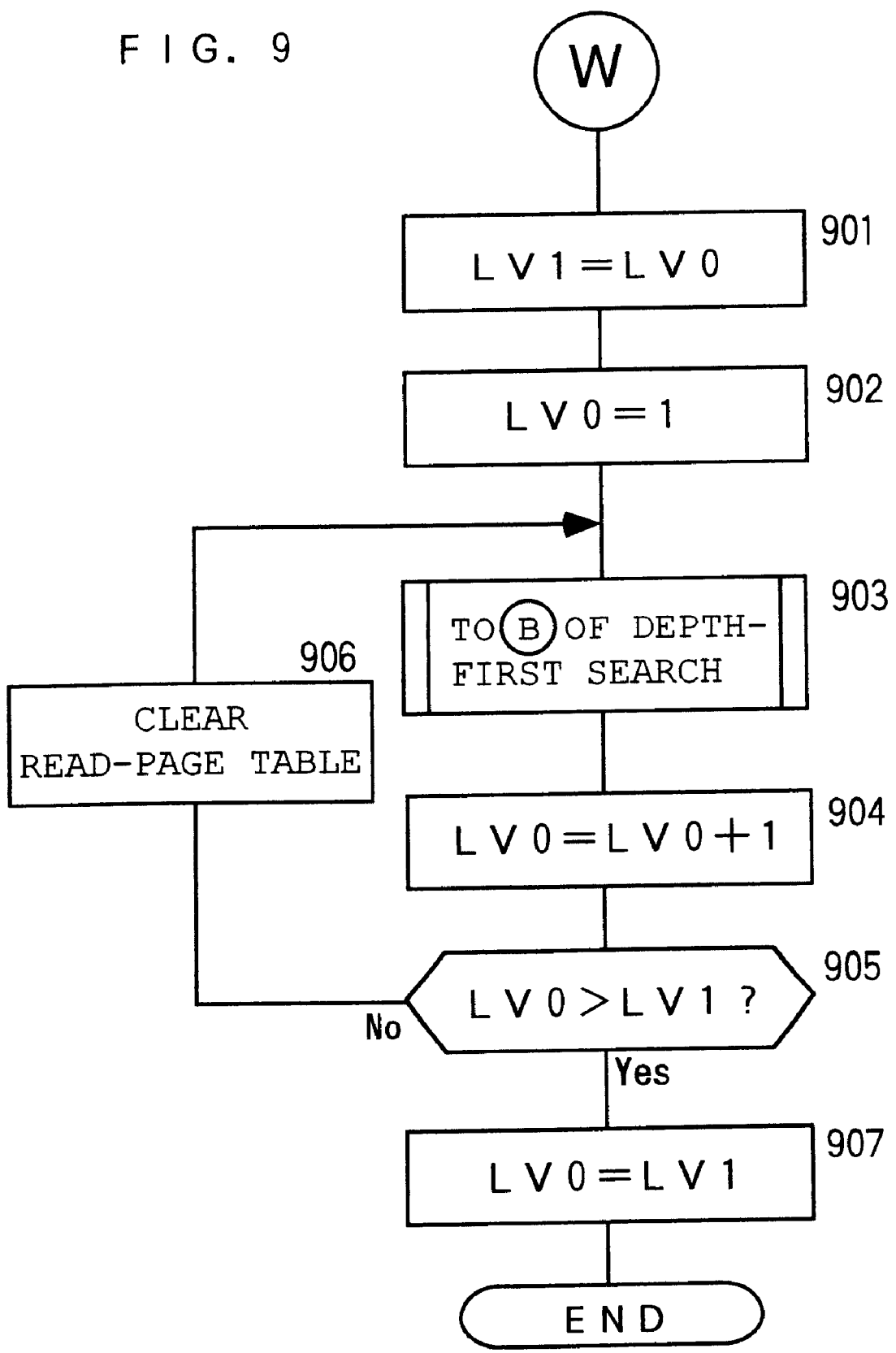
FIG. 9 is a flowchart showing an example of width-first search processing that is combined with the processing in FIG. 8.

Referring now to FIGS. 8 and 9, the CPU processing procedure for executing auto-navigation in this embodiment will be described. As described above, this processing is started by a user instruction after the line is connected.

First, the timer measuring the time to be compared with the time-out time T.O. is started (801). The interval timer function of the CPU 401 may be used as this timer. Next, a check is made to see which is specified, depth-first search or width-first search (802). If the width-first search is selected, control goes to the steps in FIG. 9; if the depth-first search is selected, control goes to step 803 in FIG. 8. In step 803, the variable LV indicating the current depth level (link level) is reset to "0" (803). This variable LV corresponds to the current position pointer 125 in the history table 120 shown in FIG. 12.

Next, the content (text) of the specified page is read, stored in the RAM (storage means) 408, analyzed for image drawing, and displayed on the television screen (804). The "specified page" is a home page of the URL specified immediately after the Internet connection has been made. When control is passed from step 818 to step 804 which will be described later, the page and its position are specified based on the history table 120.

Then, an unread link, that is, the anchor point (the first link if there are many), of the page displayed in step 804 is identified. That is, part of the page including the position of the unread link is displayed on the screen. If the position is not in the range of the page displayed first, the image is scrolled or jumped until the position appears on the screen.

Next, the above-described tables are updated (806). More specifically, for a new page, a new record is added to the history table 120 (FIG. 12), and the page 131 and its position 133 are added to the read-page table 130 (FIG. 13). At this time, because control is not yet passed to the link destination of the added link, "0" is set in the "count" 135.

Then, a check is made to see if the page display time has reached the time interval Intvl0 specified by the user (807). To do so, another timer, not shown in the figure, is used to measure the time elapsed from the start of page display.

Depending upon the page content, communication speed, or line status, a relatively long time may be required until the entire page is displayed. The display operation continues until the time interval IntvlO expires.

If there is no unread link in the current page (No in 808), control goes to step 818 which will be described below. If there is one or more unread links, the access information on the link destination of the first link (the link found in step 805) is specified (809). Because this causes control to go down one level, the link level variable LV is incremented (810). Then, the table is updated (811). More specifically, the "count" of the link of the link source in the read-page table 130 is incremented. In addition, unless the tree sequence changes, a new record is added to the history table 120. If the tree sequence changes, only the new record is added instead of the record of the old tree.

A check is made to see if the auto-navigation time-out time has elapsed (812). If the time-out time has elapsed, auto-navigation ends (END). If the time-out time has not yet elapsed, control goes to step 814. Note that step 813 is required when the return processing shown in FIG. 16, which will be described below, is employed, in which case the flag FLG is set to "0" (813). This flag FLG is used during RETURN processing in FIG. 16.

Then, the content of the page specified in step 809 is read, as in step 804, stored in the RAM 408, analyzed, and displayed (814). After the time-interval Intvl0 (815), a check is made to see if the link (the first or headmost unread link selected in step 809) is the last link of the page (816). This is determined by referencing the read-page table 130. If the link is not the last link, a check is made to see if the link level LV updated in step 810 is smaller than the link depth limit LV0 specified by the user (817). If the link level is smaller than the link depth limit specified by the user, control return to step 808, where a check is made to see if there is another unread link in the page displayed in step 814 (808). If any, control goes to the lower level link (809–816).

If, in step 817, it is determined that the link level has reached the maximum, the parent page of the current page is specified by referencing the history table 120 (818). When the tracing of all pages in the link level range is finished and control is passed back to the page where the auto-navigation was started, there is no more parent page (No in step 819) and processing ends (END). However, if control comes from the width-first search processing in FIG. 9 (No in 822), control returns to the predetermined step in FIG. 9 as will be described later.

Figure 16:
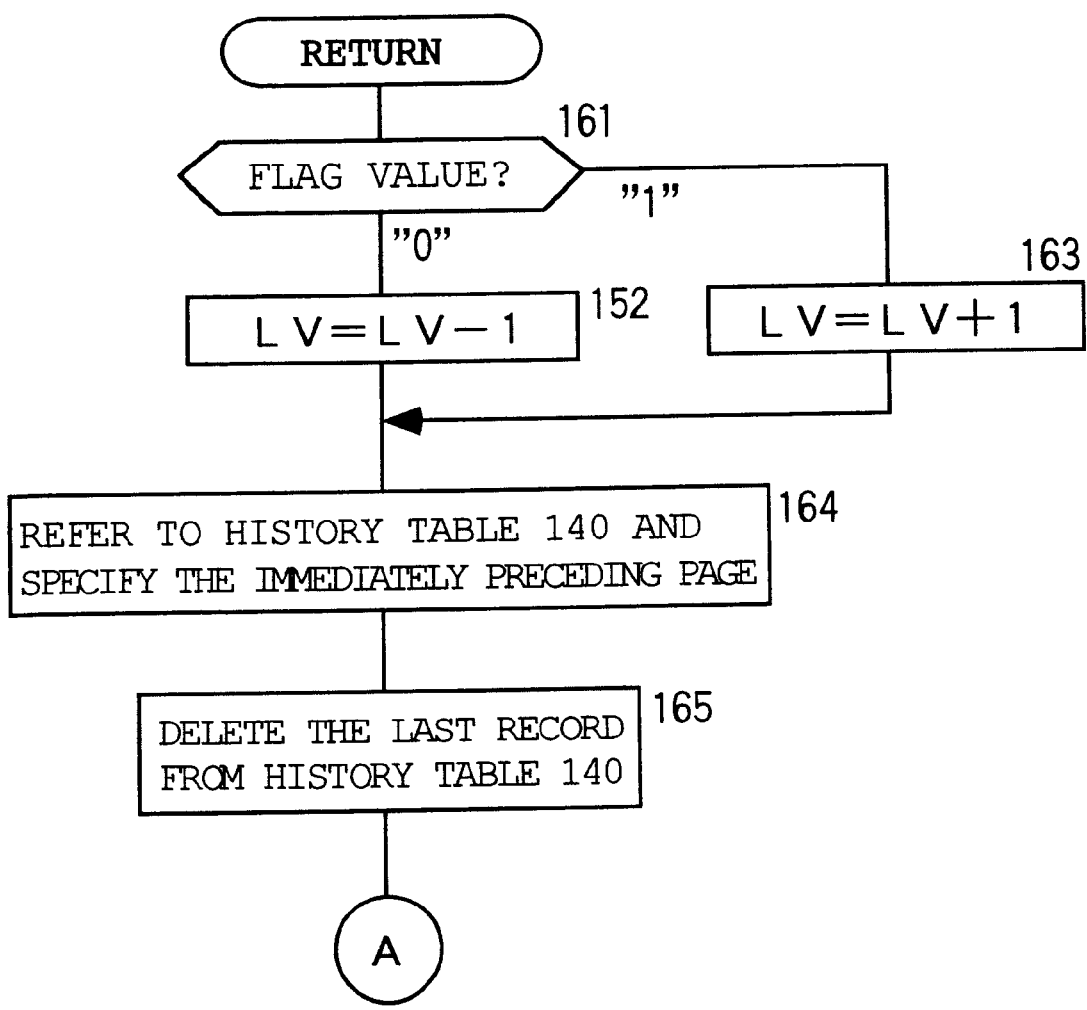
FIG. 16 is a flowchart showing anther example of the return processing of auto-navigation.

If there is a parent page in step 819, the link level LV is decremented to pass control back to the parent page (820), an then control goes back to step 804 for starting the next branch tracing. When the return processing in FIG. 16 is adopted, the flag FLG is set to "1" (821) after step 820.

The flowchart shown in FIG. 8 is applied to the example shown in FIG. 1. First, page A is displayed in step 804, and link 1 in page A is found in step 805. Then, in step 809, the link-destination page of link 1 in page A, that is, page B, is specified, the link level LV is set to "1" in step 810, and the content of page B is displayed in step 814. At this stage, because the link level LV is "1" which is lower than the maximum value LV0 "2", control returns to step 809, the link destination (page C) of the first unread link in page B (that is, link 1 in page B) is specified, the link level LV is set to "2" in step 810, and the content of page C is displayed in step 814. At this stage, because the link level LV has reached the limit of "2", control goes to step 818, the parent page B of page C is specified, and the link level LV is decremented by one to "1" in step 820.

Then, the parent page B is displayed in step 804, and the first unread link is identified in step 805. At this time, the first unread link in page B is link 2. Therefore, page D which is the link destination of link 2 is specified in step 809. The link level LV is incremented to "2" in step 810, and page D is displayed in step 814. At this time, because the link level LV has reached the limit of "2", control goes to step 818 and page B which is the parent page of page D is specified. The link level LV is reset to "1" in step 820, and page B is displayed in step 804. Then, an attempt is made to select another unread link in page B. However, since there is no more unread link in page B, control goes from step 808 to step 818, where page A which is the parent page of page B is specified, and the link level LV is reset to "0" in step 820.

Then, page A is displayed in step 804, and link 2 which is the first unread link in page A is identified in step 805. Page E which is the link destination of link 2 is displayed in step 809. After that, pages F, E, G, E, and A are traced as with page B.

Control is passed from page E back to page A and then to page H (step 814). Because it is found in step 808 that page H has no link, control returns to page A again via step 818. After that, it is found that page A has no further unread link. Control is passed to step 818 via step 808 and it is found that page A has no parent page. In step 819, control goes to step 822 and the auto-navigation processing for the depth-first search ends (END).

Next, referring to FIG. 9, the width-first search processing will be described. Comparing FIG. 2 with FIG. 3 indicates that the width-first search auto-navigation contains some part of the depth-first search. For example, part 31 in FIG. 3 corresponds to the depth-first search with the link depth limit LV0 of "1", and part 32 corresponds to the depth-first search with the link depth limit LV0 of "2". Thus, the processing shown in FIG. 9 uses a part of the depth-first search processing shown in FIG. 8.

In the flowchart in FIG. 9, the current link depth limit LV0 is saved in the variable LV1 (901) and the link depth limit L0 is forced to be set to "1" (902). After that, control jumps to step 803 in FIG. 8. In the processing shown in FIG. 8, the depth-first search processing is performed with the link depth limit of "1" according to the procedure described above and, in step 882, control returns to step 904 in FIG. 9. In that step, the link depth limit LV0 is incremented (904). Unless the value of LV0 which is incremented does not exceed LV1 (No in 905), the read-page table is cleared (906) and the depth-first search processing is performed for the new LV0 (903). That is, the depth-first search processing is performed with the link depth limit of "2". In addition, LV0 is incremented (904) and, if LV0 exceeds LV1 (Yes in 905), then the value of LV1 is put into the variable LV0 (907) and the processing ends. In the example shown in FIG. 3, control goes to step 907 when LV0 becomes "3", the value of LV0 is returned to the original value of "2", and then processing ends.

Sometimes, the user wants to get into the progress of auto-navigation. Such user operations include "suspend" which temporarily suspends the progress of auto-navigation, "restart" which restarts the progress suspended, "stop" which forces auto-navigation to stop, "skip" which skips the display of the current page, and "return" which returns control to the link-source page of the current page. These operations are executed by an interrupt to the CPU, in response to a user's operation on the remote controller 402 (special button for each operation, or button or menu operation on the screen).

Figure 10:
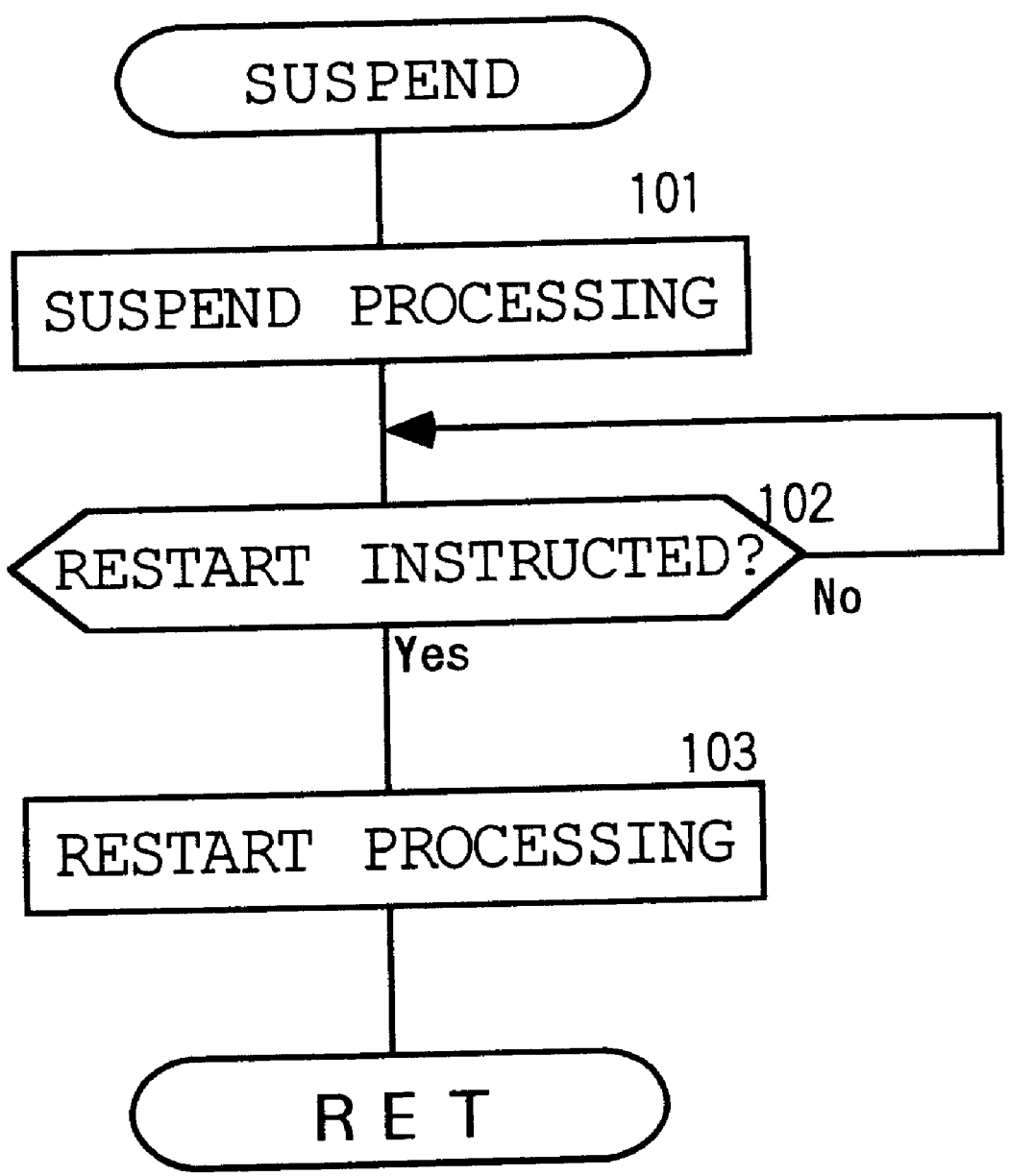
FIG. 10 is a flowchart showing an example of auto-navigation suspend processing.

FIG. 10 shows an example of flowchart of the "suspend" processing. When the user requests to suspend, auto-navigation processing is temporarily suspended (101) and, upon receiving a restart request from the user, processing is restarted (103).

Figure 11:
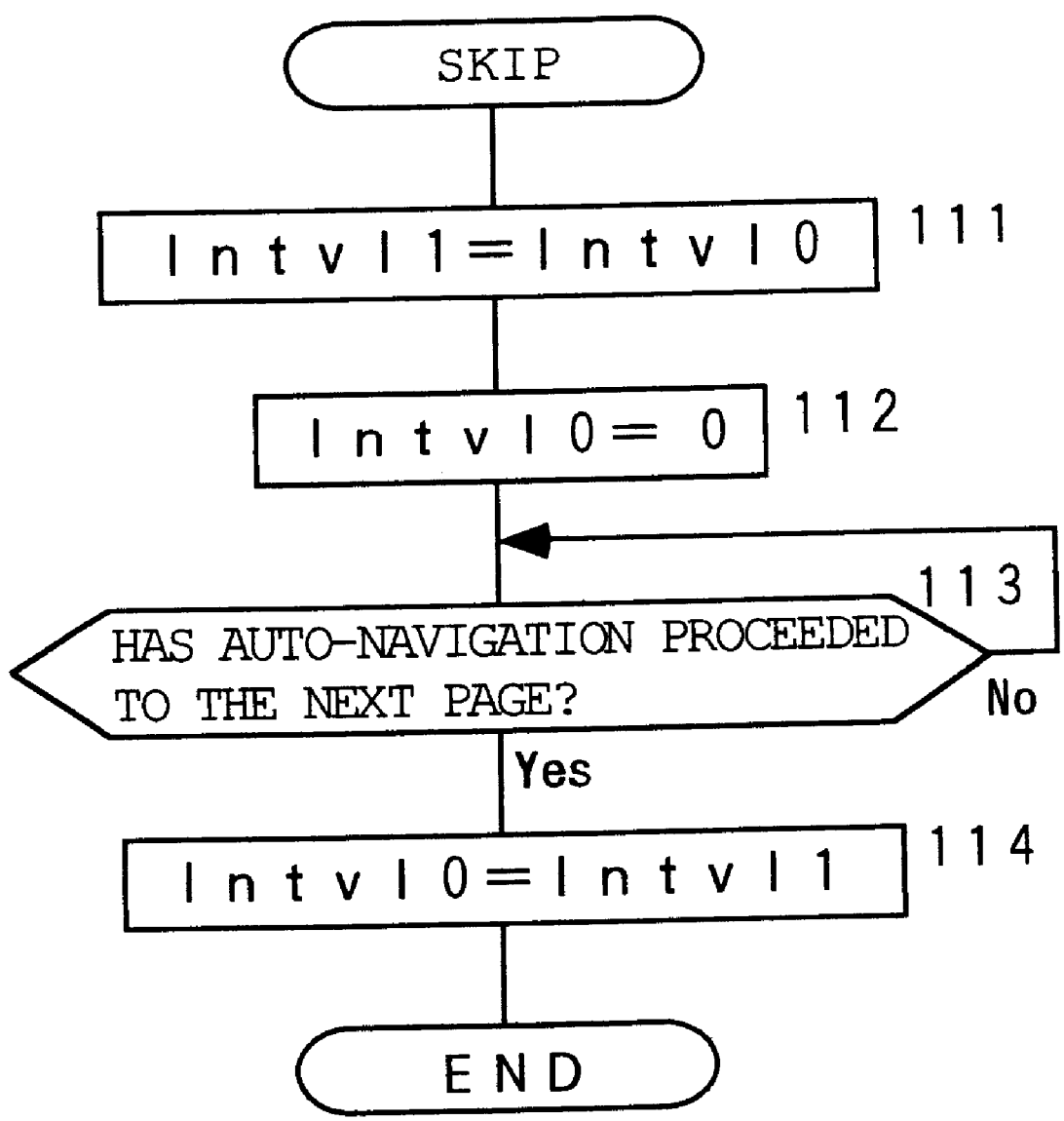
FIG. 11 is a flowchart showing an example of auto-navigation skip processing.

FIG. 11 shows an example of a "skip" processing flow. When a skip is requested from the user, the time interval INTVL0 that is specified is saved in the variable Intvl (111). Then, the time interval Intvl0 is forced to set to "0" (112). The processing shown in FIG. 11 is executed concurrently with the auto-navigation processing in a time-dividing manner. After it is confirmed that auto-navigation has proceeded to the next page (Yes in 113), the time interval Intvl0 is returned to the original value (114) to end the skip processing.

When a "return" request is made, control goes to step 818 in FIG. 8. When a "stop" request is made, control goes to END in FIG. 8.

In the above description, the history table 120 maintains only one sequence of the tree. Alternatively, the table may maintain a plurality of pages, including revisit of the same page, in the order they are traced.

FIG. 14 shows an example of the configuration of a history table 140. This table, designed for use in another type of "return" processing which will be described later, stores read pages 141 and positions 142 in chronological order. The number of records 143 may be fixed. In such a case, when the fixed-length area becomes full, older records are overwritten by new records.

FIG. 15 shows a link-source table 150 which is used with the history table 140. The link-source table 150 is used to contain the relationship between a page 151 and its link-source (that is, parent) URL 152. The configuration of the link-source URL 152 was described above. For convenience, a page 153 (file name) and a position 154 are shown here. A record 156 is added to the link-source table 150 each time the Web browser reads a new unread page (steps 806 and 811 in FIG. 8). For example, when control jumps from page A to page B for the first time in the example shown in FIG. 1, the record 156 indicating that the link source of page B is the position of link 1 in page A is recorded. When the history table 140 (FIG. 14) in this example is used, it is relatively easy to return to the page immediately preceding in time. However, when a page was read after a page other than the parent page (for example, control goes from page B to page D, returns to page B, and then returns to page A), the history table 140 contains page D immediately before page B and therefore the URL of the parent page A is unknown. The link-source table 150 is designed for dealing with this situation.

FIG. 16 is an example of a "return" processing flow corresponding to the history table 140 in FIG. 14 and the link-source table 150 in FIG. 15. In the return processing in the preceding example, control is passed directly to step 818 to return to the link-source page. However, it is sometimes desired to return to the page position displayed immediately before in time. The return processing shown in FIG. 16 is designed to meet this need. As a typical example, assume that pages are traced in order of A→B→C→B. When a return request is given at this time, control returns to page A that is the link source of page B in the preceding example, while control returns to page C which was displayed immediately before page B in this example. To do so, when the user makes a return request while a page is displayed, the value of the above-described flag FLG is checked first (161). When the flag FLG is "0", it indicates that the content of a page is being displayed in step 814 in FIG. 8 after the link level LV was incremented in step 810. Thus, the link level LV is decremented (162). On the other hand, when the flag FLG is "1", it indicates that the content of a page is being displayed in step 804 in FIG. 8 after the link level LV was decremented in step 820. Thus, the link level LV is incremented (163). After that, the history table 140 is referenced so that the page immediately preceding in time sequence is specified (164). Then, the last record is deleted from the history table 140 (165). After that, control returns to step 813 in FIG. 8.

The user may select one of the above two types of return processing.

If, in a system with a cache, desired data once read from the WWW server is to be read again and that data is still in the cache, the data may be read from the cache without having to access the WWW server, thereby reducing the time necessary to read the data.

As described above, the embodiment of the present invention allows even users unfamiliar with computers can enjoy net surfing.

Another embodiment of the present invention will now be described.

Figure 17A:
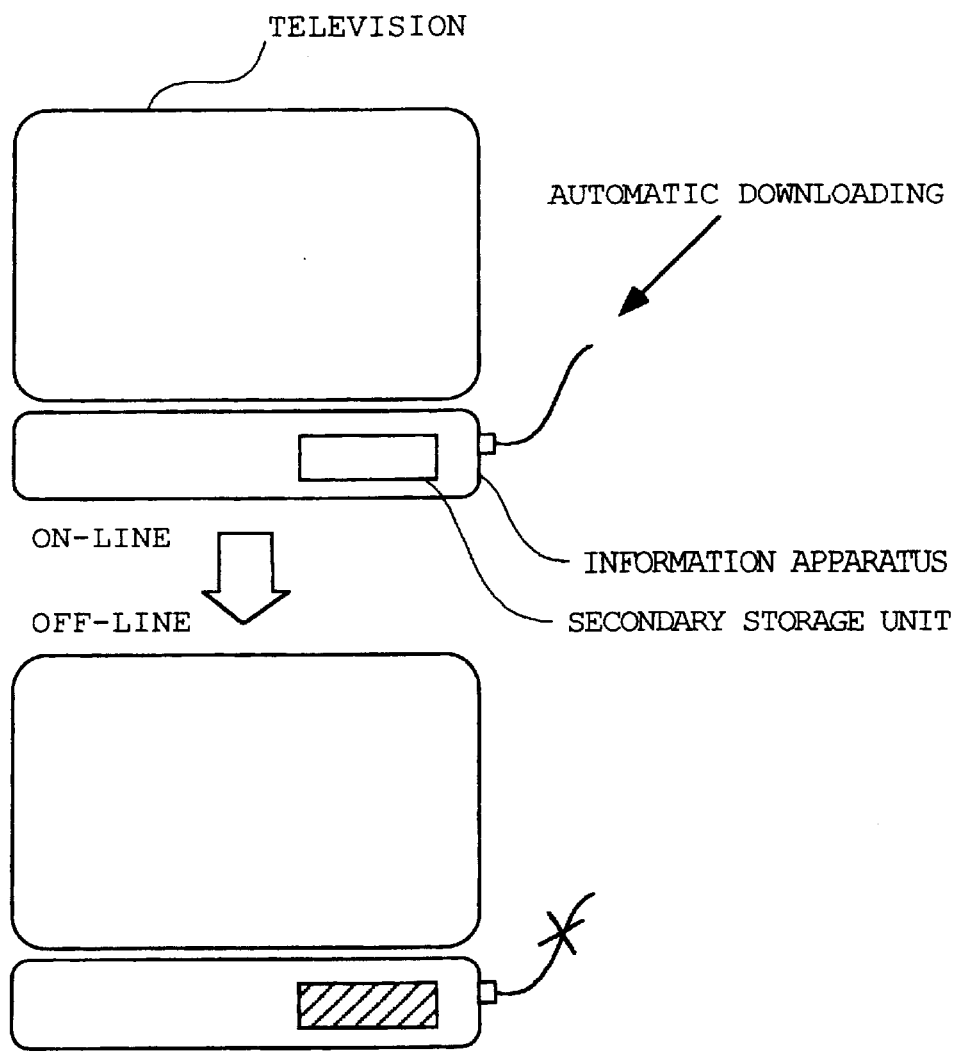
FIGS. 17(A) and (b) comprise a diagram showing a second embodiment of the present invention.
Figure 17B:
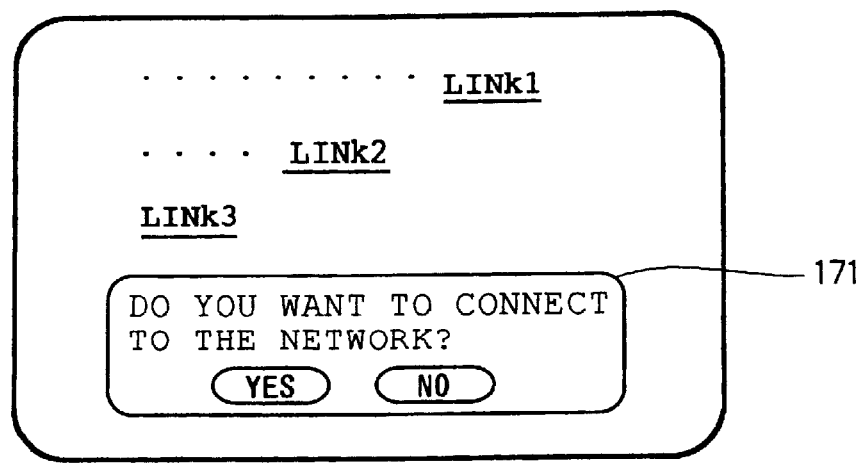

In the first embodiment, auto-navigation is executed while the user stays connected to the network, that is, in the on-line state. On the other hand, in this embodiment, the user connects to a network any time he or she wants to automatically download specific information (for example, newspaper data, television program information, weather forecasting, product information, etc.,) onto the secondary storage unit, as shown in FIG. 17(a). After that, in the state disconnected from the network, that is in the off-line state, the user performs auto-navigation based on data stored on the secondary storage unit in the same manner as described above. However, depending upon the link, the link-destination information is not stored on the secondary storage unit. To continue auto-navigation in such a state, the user must connect to the network. Because making a connection to the network involves telephone charges (plus provider charges depending upon the situation), an inquiry dialog box 171, shown in FIG. 17(b), is opened to ask the user whether to make a network connection. Whether or not a user confirmation is necessary depends on the setting specified for "CONFIRMATION" 609 in FIG. 6.

Figure 18:
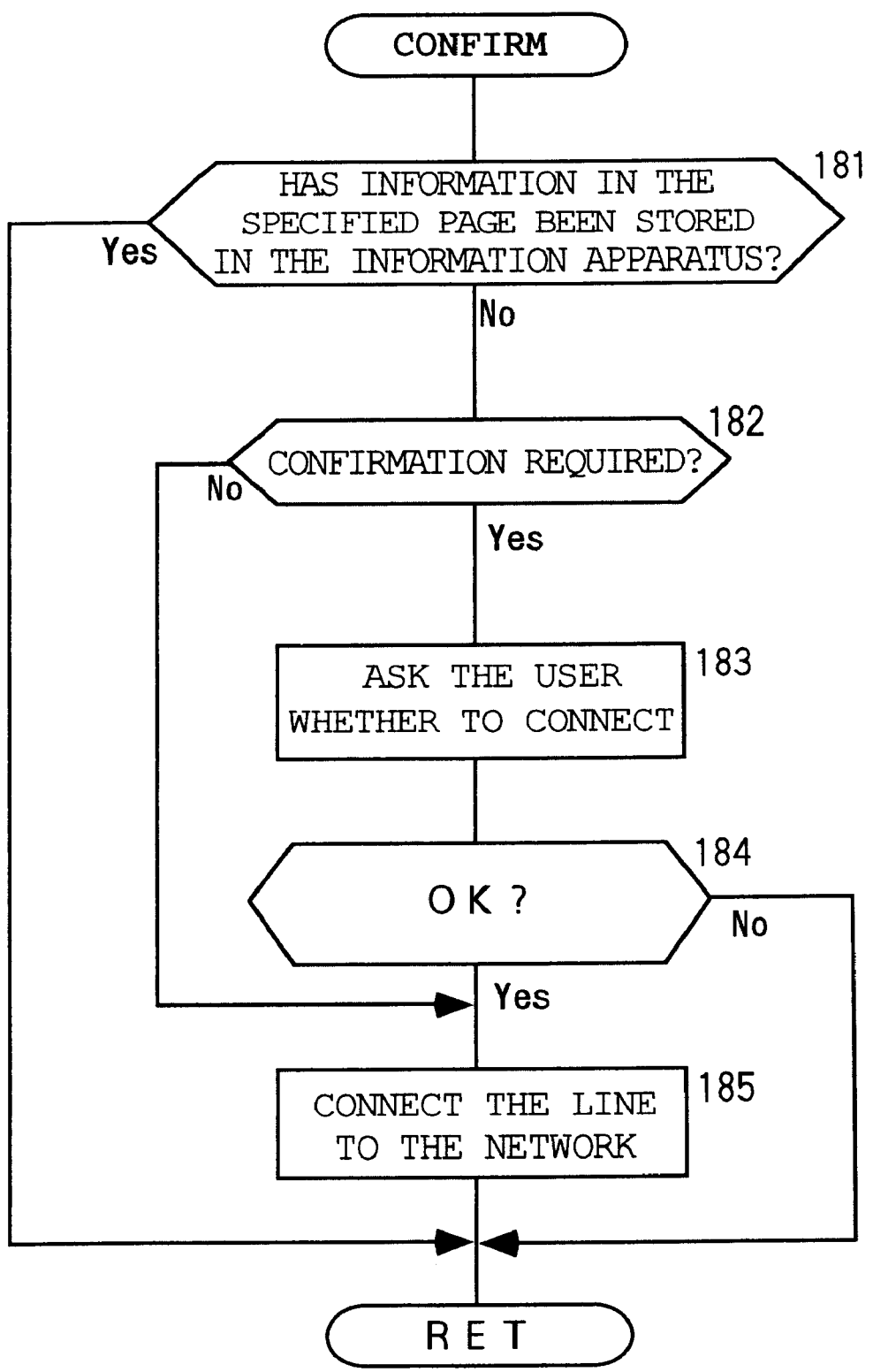
FIG. 18 is a flowchart showing the confirmation processing of auto-navigation of the second embodiment of the present invention.

FIG. 18 shows an example of a confirmation processing flow in this embodiment. This processing is performed before each of steps 804 and 814 in FIG. 8.

First, a check is made to see if the content of a specified page is stored in the information apparatus (181). If it is stored, control goes to the next step. If it is not, the confirmation is checked (182). If no confirmation is necessary, the line is automatically connected (185). If conformation is necessary, the user is asked whether to connect to the network as shown in FIG. 18(b) (183). When the user replies with YES (Yes in 184), the line is automatically connected (185); if not, the link is ignored and control goes to the next step.

Automatic downloading may be performed by specifying control parameters such as an access site URL, download time (or date), retry count (number of retries to be made at a connection failure time), limit in capacity of a page to be downloaded, and so on. The information apparatus has the clock function not shown in the figure. When the time arrives at which download is to be made, the information apparatus automatically accesses the URL of the access site to read the document of the site into the secondary storage unit. When the line connection fails, the information apparatus automatically retries the connection up to the maximum retry count. After downloading, the line is disconnected automatically. Only one URL may be specified, or a plurality of URLs may be specified so that they are accessed sequentially.

Figure 19:
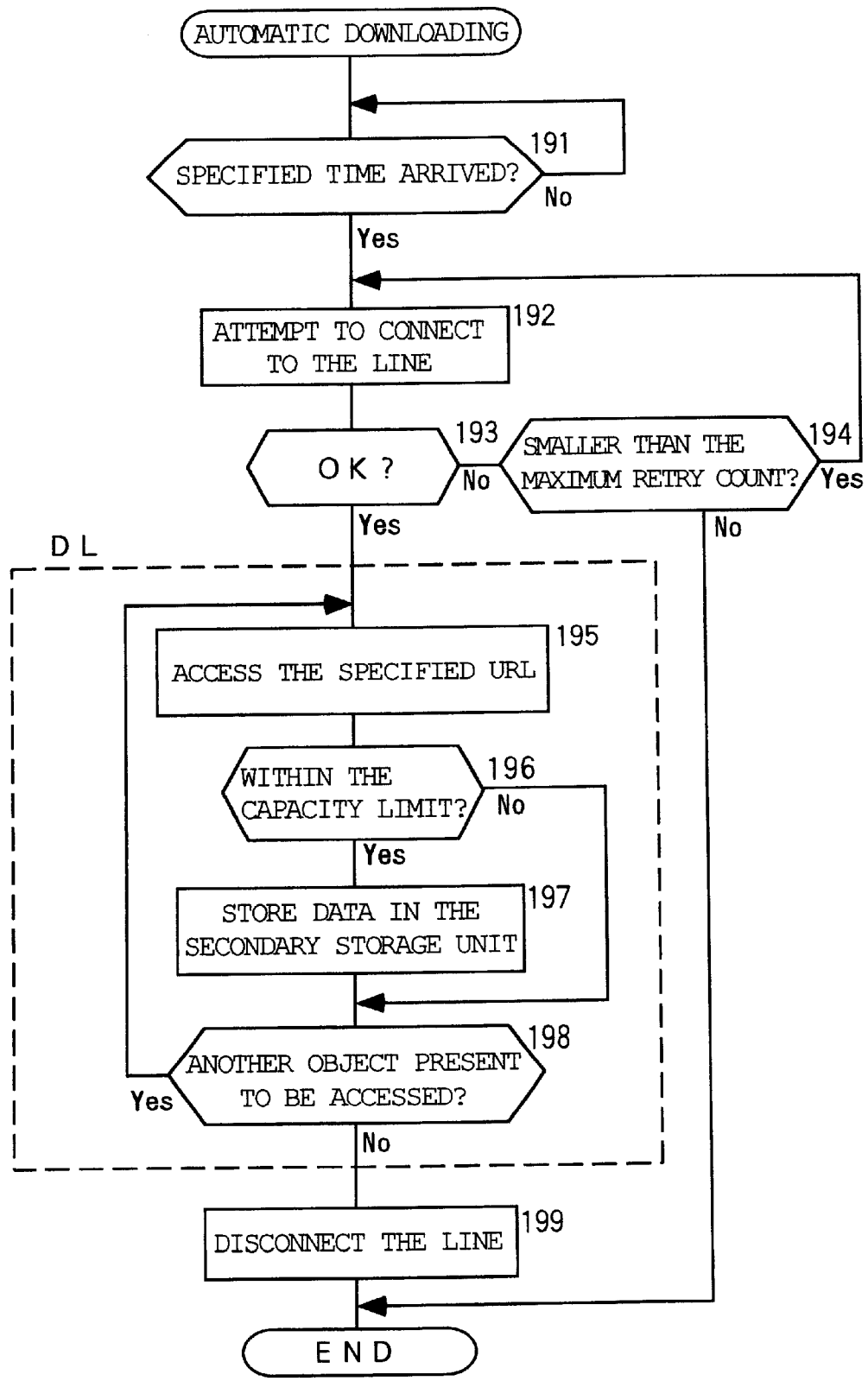
FIG. 19 is a flowchart showing an example of automatic downloading that is required for auto-navigation used in the second embodiment of the present invention.
Figure 21:
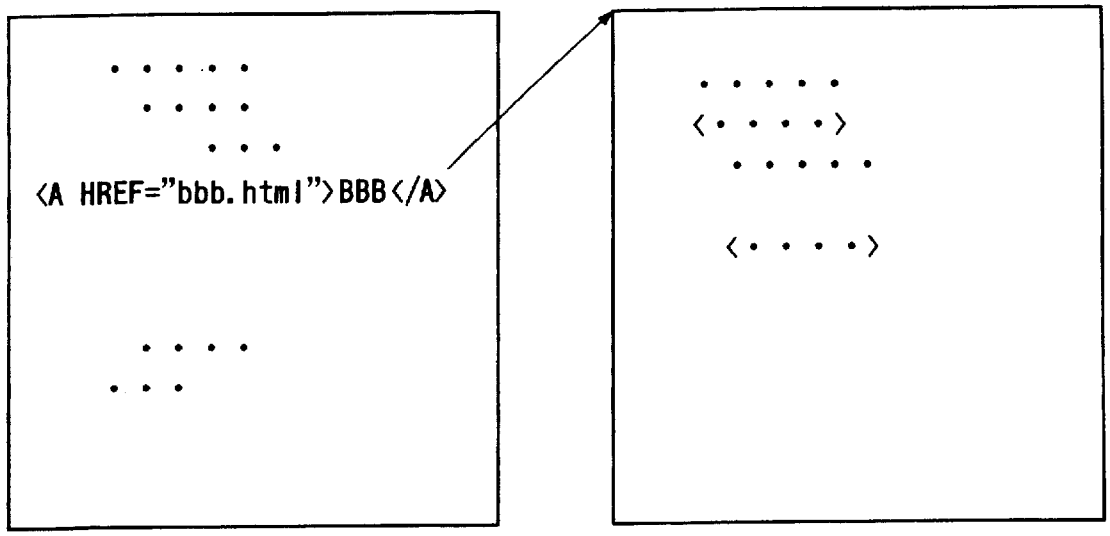
FIGS. 21(a) and (b) comprise a diagram showing the links used in the HTML document.
Figure 21:
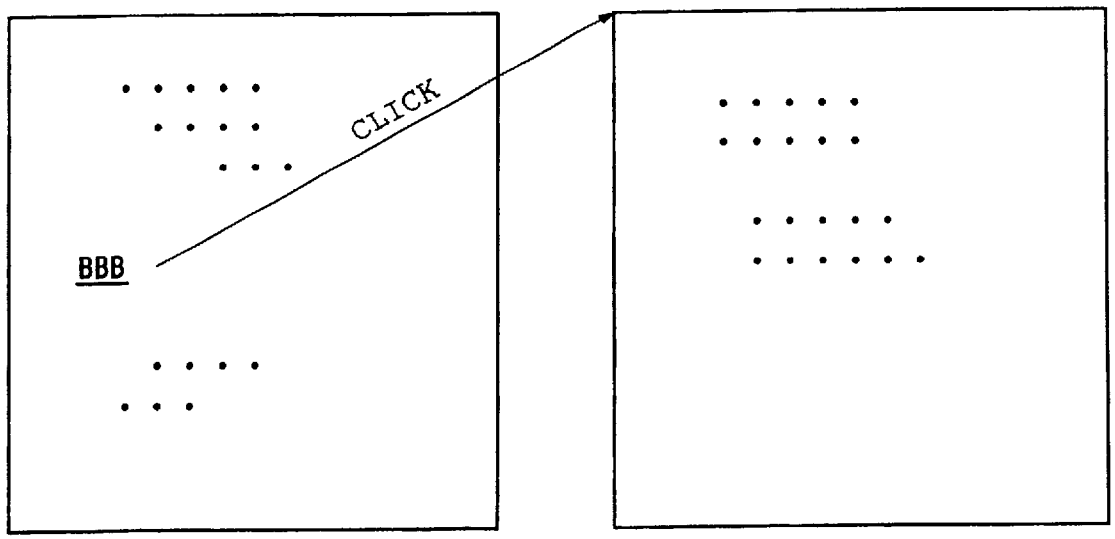
Figure 22A:
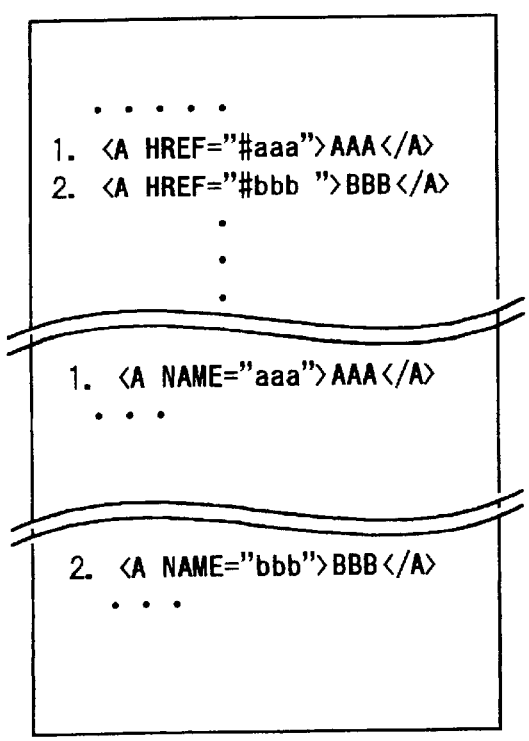
FIGS. 22(a) and (b) comprise a diagram showing the links used in the HTML document.
Figure 22B:
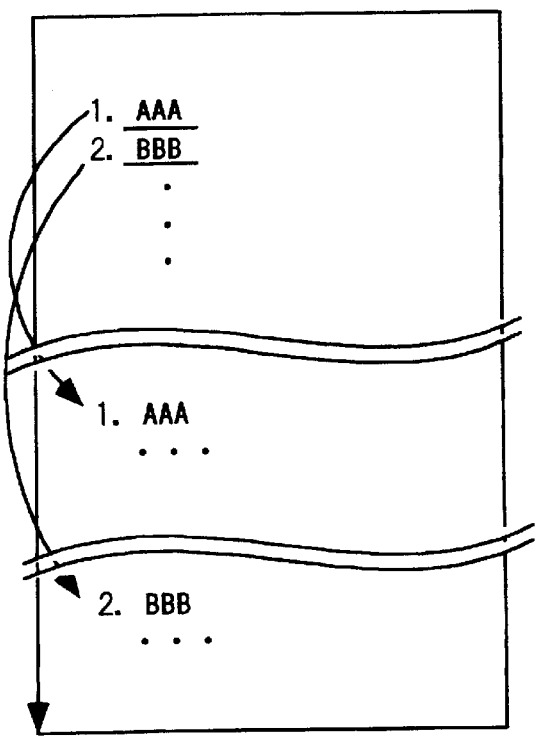
Figure 23:
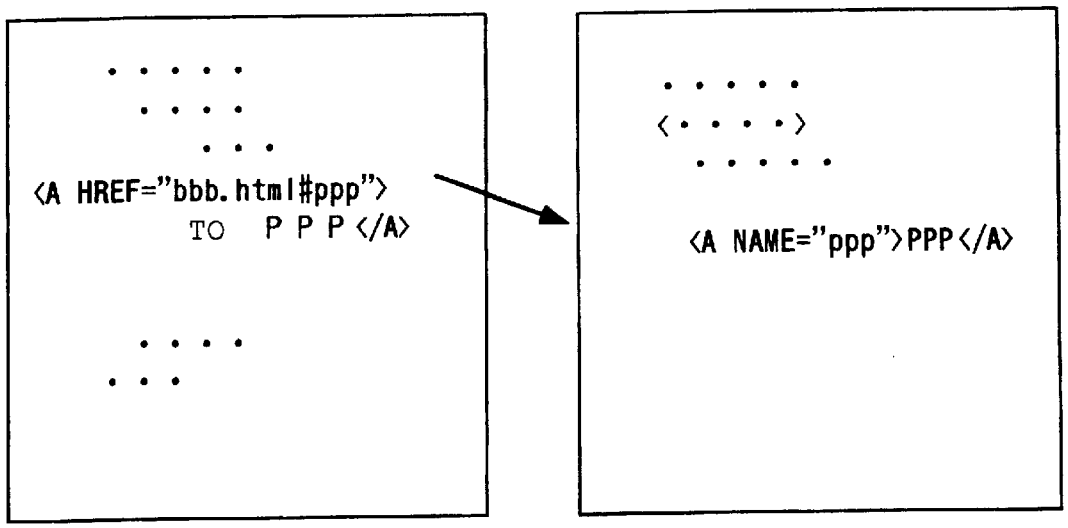
FIGS. 23(a) and (b) comprise a diagram showing the links used in the HTML document.
Figure 23:
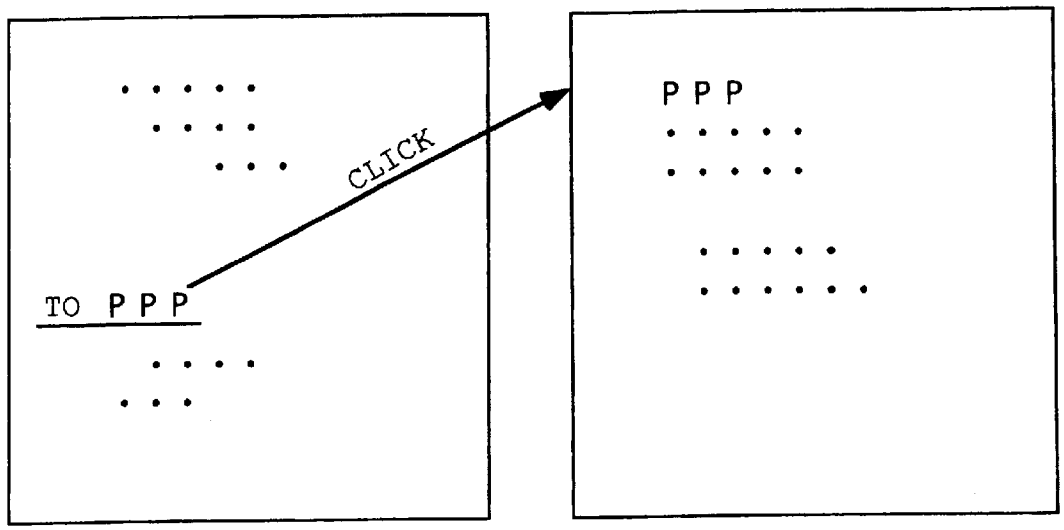
Figure 24:
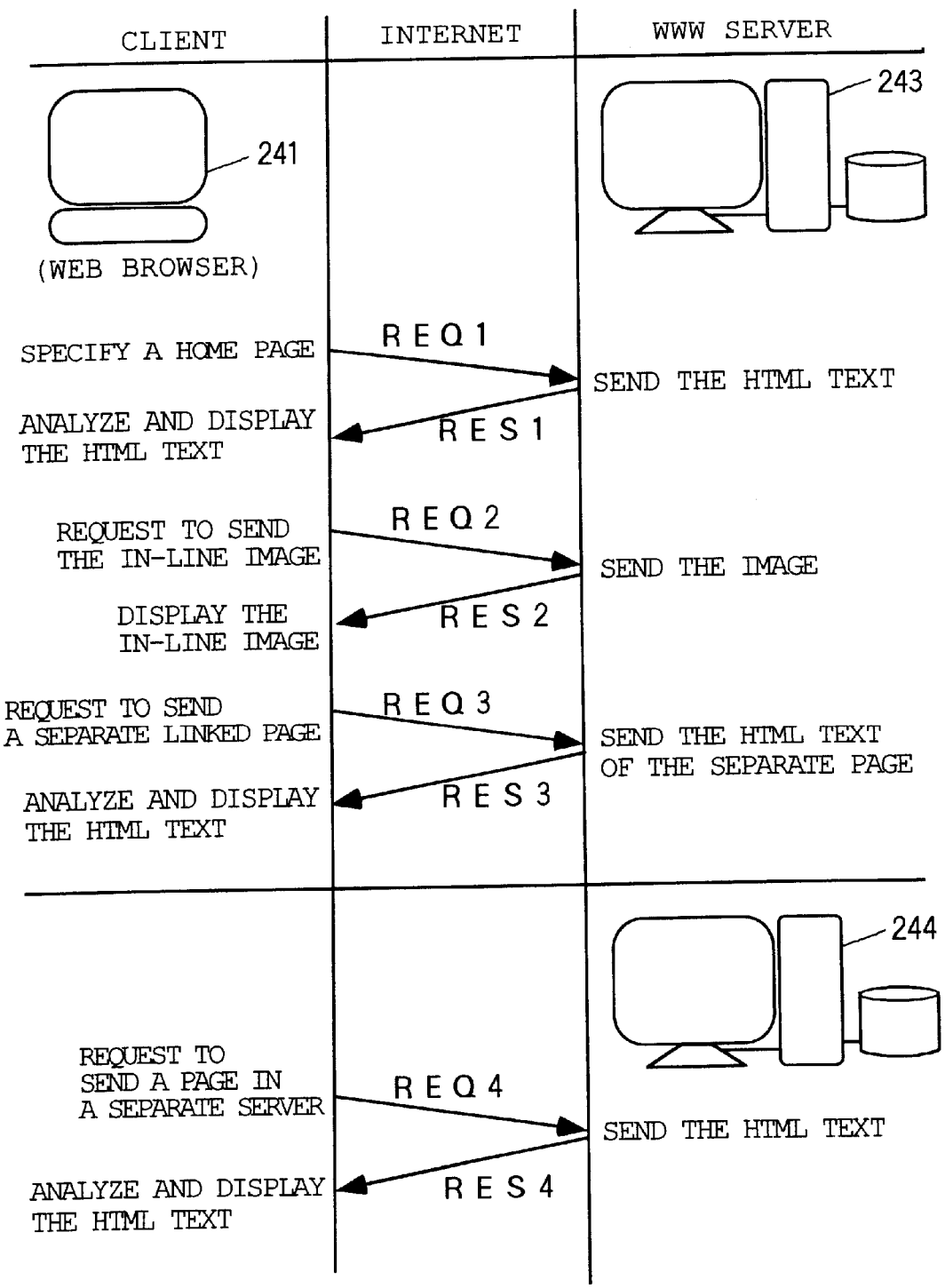
FIG. 24 is a diagram showing the information transfer between a client and a WWW server on the Internet.

FIG. 19 shows a flowchart of an example of processing of this embodiment.

When the clock function finds that the time has arrived (Yes in 191), an attempt is made to connect the line (192). When the line connection fails (No in 193), the connection is retried up to the number of times specified by the retry count (194, 192). When the retry count is exceeded, the apparatus gives up the line connection and ends processing (END).

When the line is successfully connected (Yes in 193), the download processing DL is executed. First, access is made to the specified URL during the download processing DL (195). At this time, when the page capacity exceeds the predetermined capacity limit (No in 196), control goes to step 198. When the capacity limit is not exceeded, the page is read into the secondary storage unit (197). If there is another object to be accessed (Yes in 198), control returns to step 195; if not (No in 198), the line is disconnected (199) and processing ends (END).

The auto-navigation function according to the present invention may be used in the automatic download processing DL. In that case, each time a page is read, it is stored in the secondary storage unit. The time interval 605, one of the parameters shown in FIG. 6, is disabled so that after reading entire data of the page, control goes to the next page. For a page once read, the same data is not stored in the secondary unit again even if control is passed to that page. The confirmation 609 function is also disabled.

This embodiment allows the user to access the network at a time when the telephone charge is low, to download necessary information, and to perform auto-navigation based on the data. In addition, because display data is stored in the secondary storage unit, no communication time is required, reducing the display time for browsing.

As an example of application, the auto-navigation function according to the present invention may be applied to an information guide or a bulletin board whose content is changed automatically. That is, the content of a link location or a link destination is created in an HTML document in a form suitable for an information guide and then the auto-navigation function is applied to this home page. This application may be implemented in both the on-line and off-line modes.

The automatic Web tracing function according to the present invention has been described above. This function may be applied to the software, i.e., the browser in general, for personal computers or Personal Digital Assistants (PDA).

Industrial Applicability

The present invention may be applied to a television set, its adapter, or a Web browser. According to the present invention, time-varying information can passively be received as if it were television information, minimizing operation steps necessary for a user to perform the automatic Web browsing of the Internet. In addition, the off-line navigation on information once stored in the apparatus saves the telephone charges and reduces the time needed for displaying pages.

What is claimed is:

1. An information apparatus with an automatic browsing function, said information apparatus comprising:

access means for accessing documents on the Internet;

storage means for storing data of the accessed documents; and automatic Web tracing means for sequentially and automatically tracing link destinations according to a predetermined rule and parameters based on link information which is defined in the documents stored in the storage means;

wherein said predetermined rule is one of a depth-first search and a width-first search and said parameters include at least a link depth limit to be used when the link destinations are sequentially traced downward and a time interval at which control moves from one document to another; and wherein said automatic Web tracing means include a history table in which a page access information history is stored each time control moves from a link source to ones of the link destinations and a read-page table in which information indicating, for each link destination of each link in a page, whether the link destination was visited or not, wherein said history table is referenced when control returns from one of the link destinations to the link source during automatic Web tracing and said read-page table is referenced to check for unread links.

2. The information apparatus with the automatic Web browsing function according to claim 1, wherein said parameters further include an automatic Web tracing time-out time.

3. The information apparatus with the automatic Web browsing function according to claim 1, said information apparatus further comprising specifying means for allowing a user to specify said rule and parameters.

4. The information apparatus with the automatic Web browsing function according to any one of claims 1–3, said information apparatus being connected to the Internet via a public line and further comprising non-volatile storage means for storing the documents obtained from the Internet, wherein said automatic Web tracing means perform automatic Web tracing for the documents stored in said non-volatile storage means when said information apparatus is not connected to the Internet.

5. The information apparatus with the automatic Web browsing function according to claim 4, further comprising inquiry means for asking a user if a connection is to be made automatically to the Internet when the document at one of the link destinations is not stored in said non-volatile storage means during automatic Web tracing.

6. The information apparatus with the automatic Web browsing function according to claim 4, further comprising automatic downloading means for storing the documents into said non-volatile storage means during automatic Web tracing by said automatic Web tracing means.

7. A computer-readable recording medium having stored therein a computer program which comprises the functions of:

accessing documents on the Internet; and sequentially and automatically tracing link destinations automatically according to a predetermined rule and parameters based on link information defined in the accessed documents;

wherein said predetermined rule is one of a depth-first search and a width-first search and said parameters include at least a link depth limit to be used when the link destinations are sequentially traced downward and a time interval at which control moves from one document to another; and wherein said function of sequentially and automatically tracing link destinations uses a history table in which a page access information history is stored each time control moves from a link source to ones of the link destinations and a read-page table in which information indicating, for each link destination of each link in a page, whether the link destination was visited or not, wherein said history table is referenced when control returns from one of the link destinations to the link source during automatic Web tracing and said read-page table is referenced to check for unread links.

8. The recording medium according to claim 7, wherein said parameters further include an automatic Web tracing time-out time.

9. The recording medium according to claim 7, said computer program further comprising the function of allowing a user to specify said rule and parameters.

10. The recording medium according to claim 7, said information apparatus on which said computer program is executed being connected to the Internet via a public line and further comprising non-volatile storage means for storing the documents obtained from the Internet, wherein said computer program further comprises a function of performing automatic Web tracing for the documents stored in said non-volatile storage means when said information apparatus is not connected to the Internet.

11. The recording medium according to claim 10, said computer program further comprising an inquiry function of asking a user if a connection is to be made automatically to the Internet when the document at one of the link destinations is not stored in said non-volatile storage means during automatic Web tracing.

12. The recording medium according to claim 10, said computer program further comprising an automatic downloading function of storing the documents into said non-volatile storage means during automatic Web tracing through said automatic Web tracing means.

* * * * *